United States Patent
Kazemi et al.

(10) Patent No.: US 10,168,705 B2
(45) Date of Patent: Jan. 1, 2019

(54) AUTOMATIC TUNING OF AUTONOMOUS VEHICLE COST FUNCTIONS BASED ON HUMAN DRIVING DATA

(71) Applicant: Uber Technologies, Inc., San Francisco, CA (US)

(72) Inventors: Moslem Kazemi, Allison Park, PA (US); Jacob Panikulam, Pittsburgh, PA (US); Chenggang Liu, Pittsburgh, PA (US); Andy Lee, Pittsburgh, PA (US); David McAllister Bradley, Pittsburgh, PA (US); Charles R. Hogg, III, Bellevue, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/700,689

(22) Filed: Sep. 11, 2017

(65) Prior Publication Data

US 2018/0292824 A1    Oct. 11, 2018

Related U.S. Application Data

(63) Continuation-in-part of application No. 15/607,994, filed on May 30, 2017.

(60) Provisional application No. 62/482,280, filed on Apr. 6, 2017.

(51) Int. Cl.
*G05D 1/00* (2006.01)
*G08G 1/01* (2006.01)
*G05D 1/02* (2006.01)

(52) U.S. Cl.
CPC ........ *G05D 1/0088* (2013.01); *G05D 1/0221* (2013.01); *G08G 1/0112* (2013.01); *G08G 1/0129* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 8,935,232 B2* | 1/2015 | Abadi | ............... | G06F 17/30445 707/713 |
| 9,336,263 B2* | 5/2016 | Abadi | ............... | G06F 17/30569 |
| 9,483,509 B2* | 11/2016 | Balikov | ............ | G06F 17/30312 |
| 9,495,427 B2* | 11/2016 | Abadi | ............... | G06F 17/30545 |
| 9,645,577 B1* | 5/2017 | Frazzoli | ............... | G05D 1/0214 |
| 9,760,595 B1* | 9/2017 | Goldman | .......... | G06F 17/30371 |
| 9,886,325 B2* | 2/2018 | Malewicz | ............. | G06F 9/5077 |
| 2004/0049295 A1* | 3/2004 | Wojsznis | ............... | G05B 11/32 700/28 |

(Continued)

OTHER PUBLICATIONS ("Hadoop MapReduce Tutorial" https://data-flair.training/blogs/hadoop-mapreduce-tutorial/, Nov. 23, 2016 in Hadoop Tutorials / MapReduce Tutorials by Shailna P (Year: 2016).*

(Continued)

*Primary Examiner* — Navid Ziaeianmehdizadeh
(74) *Attorney, Agent, or Firm* — Dority & Manning, PA

(57) ABSTRACT

The present disclosure provides systems and methods that enable an autonomous vehicle motion planning system to learn to generate motion plans that mimic human driving behavior. In particular, the present disclosure provides a framework that enables automatic tuning of cost function gains included in one or more cost functions employed by the autonomous vehicle motion planning system.

16 Claims, 10 Drawing Sheets

(56) References Cited

U.S. PATENT DOCUMENTS

| | | | | |
|---|---|---|---|---|
| 2007/0087756 | A1* | 4/2007 | Hoffberg | G06Q 10/0631 455/450 |
| 2011/0276789 | A1* | 11/2011 | Chambers | G06F 9/3885 712/220 |
| 2012/0297145 | A1* | 11/2012 | Castillo | G06F 12/0868 711/138 |
| 2014/0195093 | A1* | 7/2014 | Litkouhi | B62D 15/0255 701/23 |
| 2015/0277965 | A1* | 10/2015 | Bradshaw | G06F 9/466 718/101 |
| 2016/0034530 | A1* | 2/2016 | Nguyen | G06F 17/30463 707/719 |
| 2016/0124730 | A1* | 5/2016 | Boehm | G06F 8/45 717/149 |
| 2016/0129907 | A1* | 5/2016 | Kim | B60W 30/09 701/26 |
| 2016/0291942 | A1* | 10/2016 | Hutchison | G06F 8/451 |
| 2016/0334797 | A1* | 11/2016 | Ross | G05D 1/0027 |
| 2017/0050638 | A1* | 2/2017 | Gordon | B60W 30/16 |
| 2017/0090480 | A1* | 3/2017 | Ho | G05D 1/0214 |
| 2017/0123421 | A1* | 5/2017 | Kentley | G01C 21/26 |
| 2017/0139423 | A1* | 5/2017 | El Ferik | G05D 1/0295 |
| 2017/0192431 | A1* | 7/2017 | Foster | G05D 1/0212 |
| 2017/0253241 | A1* | 9/2017 | Filev | B60W 50/0097 |
| 2017/0267256 | A1* | 9/2017 | Minster | B60W 50/10 |
| 2017/0305434 | A1* | 10/2017 | Ratnasingam | B60W 40/09 |
| 2017/0320491 | A1* | 11/2017 | Teller | B60W 30/08 |

OTHER PUBLICATIONS

Kalakrishnan et al., "Learning Locomotion Over Rough Terrain Using Terrain Templates", International Conference on Intelligent Robots and Systems, Oct. 10-15, 2009, pp. 167-172.

Kolter et al., "Hierarchical Apprenticeship Learning with Application to Quadruped Locomotion", Neural Information Processing Systems, Vancouver, British Columbia, Canada, Dec. 3-5, 2007, 8 pages.

Kuderer et al., "Learning Driving Styles for Autonomous Vehicles from Demonstration", IEEE International Conference on Robotics and Automation, Seattle, Washington, May 26-May 30, 2015, 6 pages.

Ratliff et al., "Learning to Search: Functional Gradient Techniques for Imitation Learning", Autonomous Robots, vol. 27, Issue 1, Jul. 2009, pp. 25-53.

Ratliff et al., "Maximum Margin Planning", International Conference on Machine Learning, Pittsburgh, Pennsylvania, Jun. 25-29, 2006, 8 pages.

Ratliff et al., "Subgradient Methods for Maximum Margin Structured Learning", Proceedings of the ICML Workshop on Learning in Structured Output Spaces, Cornell University, Fall 2006, 5 pages.

Silver et al., "Active Learning from Demonstration for Robust Autonomous Navigation" International Conference on Robotics and Automation, St. Paul, Minnesota, May 14-18, 2012, 8 pages.

Silver et al., "Learning Autonomous Driving Styles and Maneuvers front Expert Demonstration", International Symposium on Experimental Robotics, Quebec City, Canada, Jun. 18-21, 2012, 15 pages.

Silver et al., "Learning from Demonstration for Autonomous Navigation in Complex Unstructured Terrain", International Journal of Robotics Research, vol. 29, No. 12, 2010, pp. 1565-1592.

Zinkevich et al., "Parallelized Stochastic Gradient Descent", Neural Information Processing Systems, Vancouver, Canada, Dec. 6-11, 2010, 37 pages.

Zucker et al., "Optimization and Learning for Rough Terrain Legged Locomotion", International Journal of Robotics Research, vol. 30, Issue 2, Feb. 2011, pp. 175-191.

* cited by examiner

AUTOMATIC TUNING OF AUTONOMOUS VEHICLE COST FUNCTIONS BASED ON HUMAN DRIVING DATA

PRIORITY CLAIM

The present application is a continuation-in-part of U.S. application Ser. No. 15/607,994 having a filing date of May 30, 2017, which claims the benefit of U.S. Provisional Application Ser. No. 62/482,280 filed Apr. 6, 2017. The present application claims priority to and benefit of all such applications and incorporates all such applications herein by reference.

FIELD

The present disclosure relates generally to autonomous vehicles. More particularly, the present disclosure relates to automatic tuning of a plurality of gains of one or more cost functions used by a motion planning system of an autonomous vehicle.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to automatically tune cost function gains of an autonomous vehicle motion planning system. The method includes obtaining, by one or more computing devices, data descriptive of a humanly-executed motion plan that was executed by a human driver during a previous humanly-controlled vehicle driving session. The method includes generating, by the autonomous vehicle motion planning system, an autonomous motion plan based at least in part on a data log that includes data collected during the previous humanly-controlled vehicle driving session. Generating, by the autonomous vehicle motion planning system, the autonomous motion plan includes evaluating, by the autonomous vehicle motion planning system, one or more cost functions. The one or more cost functions include a plurality of gain values. The method includes evaluating, by the one or more computing devices, an objective function that provides an objective value based at least in part on a difference between a first total cost associated with the humanly-executed motion plan and a second total cost associated with the autonomous motion plan. Evaluating the objective function includes inputting, by the one or more computing devices, the humanly-executed motion plan into the one or more cost functions of the autonomous vehicle motion planning system to determine the first total cost associated with the humanly-executed motion plan. Evaluating the objective function includes inputting, by the one or more computing devices, the autonomous motion plan into the one or more cost functions of the autonomous vehicle motion planning system to determine the second total cost associated with the autonomous motion plan. The method includes determining, by the one or more computing devices, at least one adjustment to at least one of the plurality of gain values of the one or more cost functions that reduces the objective value provided by the objective function.

Another example aspect of the present disclosure is directed to a computer system. The computer system includes one or more processors and one or more tangible, non-transitory, computer readable media that collectively store instructions that, when executed by the one or more processors, cause the computer system to perform operations. The operations include obtaining data descriptive of a humanly-executed motion plan that was executed by a human driver during a previous humanly-controlled vehicle driving session. The operations include generating an autonomous motion plan based at least in part on a data log that includes data collected during the previous humanly-controlled vehicle driving session. Generating the autonomous motion plan includes evaluating one or more cost functions to generate the autonomous motion plan. The one or more cost functions include a plurality of gain values. The operations include evaluating an objective function that provides an objective value based at least in part on a difference between a first total cost associated with the humanly-executed motion plan and a second total cost associated with the autonomous motion plan. Evaluating the objective function includes inputting the humanly-executed motion plan into the one or more cost functions to determine the first total cost associated with the humanly-executed motion plan. Evaluating the objective function includes inputting the autonomous motion plan into the one or more cost functions to determine the second total cost associated with the autonomous motion plan. The operations include determining at least one adjustment to at least one of the plurality of gain values of the one or more cost functions that reduces the objective value provided by the objective function.

Another example aspect of the present disclosure is directed to a computer system. The computer system includes one or more processors and one or more tangible, non-transitory, computer-readable media that collectively store a data log that includes data collected during a previous humanly-controlled vehicle driving session. The computer system includes an autonomous vehicle motion planning system implemented by the one or more processors. The motion planning system includes an optimization planner that is configured to optimize one or more cost functions that include a plurality of gains to generate an autonomous motion plan for an autonomous vehicle. The computer system includes an automatic tuning system implemented by the one or more processors. The automatic tuning system is configured to receive an autonomous motion plan generated by the autonomous vehicle motion planning system based at least in part on the data collected during the previous humanly-controlled vehicle driving session. The optimization planner optimized the one or more cost functions to generate the autonomous motion plan. The automatic tuning system is configured to obtain a humanly-executed motion plan that was executed during the previous humanly-controlled vehicle driving session. The automatic tuning system is configured to optimize an objective function to determine an adjustment to at least one of the plurality of gains. The objective function provides an objective value based at least in part on a difference between a first total cost obtained by input of the humanly-executed motion plan into the one or more cost functions of the autonomous vehicle motion planning system and a second total cost obtained by input of the autonomous motion plan into the one or more cost functions of the autonomous vehicle motion planning system.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
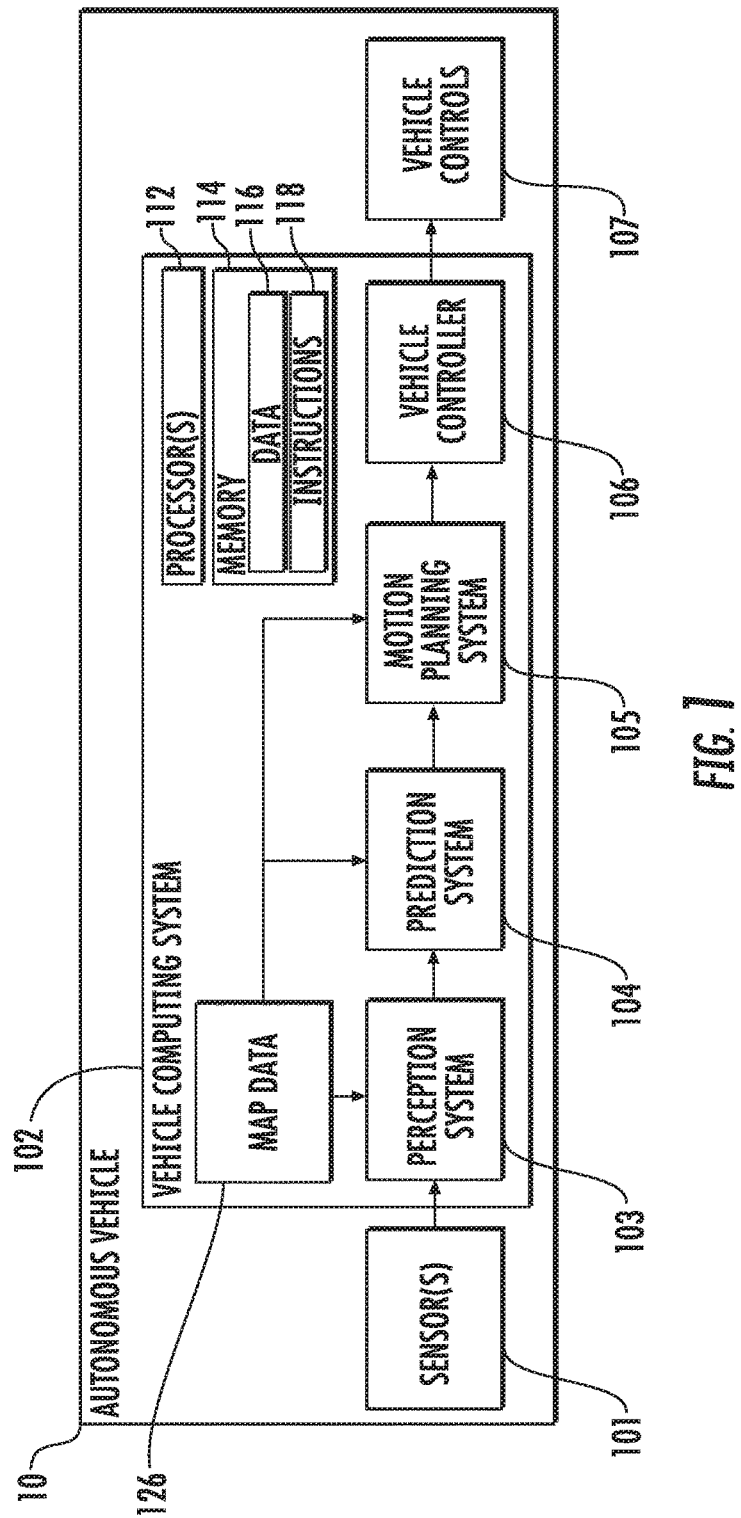
FIG. 1 depicts a block diagram of an example autonomous vehicle according to example embodiments of the present disclosure.

Generally, the present disclosure is directed to systems and methods that enable an autonomous vehicle motion planning system to learn to generate motion plans that mimic human driving behavior. In particular, the present disclosure provides a framework that enables automatic tuning of cost function gains included in one or more cost functions employed by the autonomous vehicle motion planning system. Gains of the one or more cost functions can include coefficients, thresholds, or other configurable parameters of the one or more cost functions that, for example, serve to effectuate a balance between competing concerns (e.g., in the form of cost features) when the motion planning system generates an autonomous motion plan for the autonomous vehicle. In particular, the autonomous vehicle motion planning system can include an optimization planner that iteratively optimizes over a vehicle state space to obtain a trajectory which minimizes the total cost (e.g., combination of one or more cost functions).

More particularly, an automatic tuning system of the present disclosure can automatically tune the cost function gains by minimizing or otherwise optimizing an objective function that provides an objective value based at least in part on a difference in respective total costs between a humanly-executed motion plan and an autonomous motion plan generated by the autonomous vehicle motion planning system. In particular, the automatic tuning system can respectively input the humanly-executed motion plan and the autonomous motion plan into the one or more cost functions used by the optimization planner of the autonomous vehicle motion planning system to obtain their respective total costs. The automatic tuning system can iteratively adjust the gains of the one or more cost functions to minimize or otherwise optimize the objective function. In addition, in some implementations, the objective function can encode a constraint that the difference in respective total costs between the humanly-executed motion plan and the autonomous motion plan is greater than or equal to a margin. For example, the margin can be positively correlated to a degree of dis-similarity between the humanly-executed motion plan and the autonomous motion plan.

Thus, the systems and methods of the present disclosure leverage the existing cost function structure used by the optimization planner of the autonomous vehicle motion planning system, which may, in some implementations, be or include a linear quadratic regulator. In particular, rather than attempting to teach the motion planning system to directly replicate the humanly-executed trajectory within the vehicle state space, the systems and methods of the present disclosure enable the autonomous vehicle motion planning system to learn to generate motion plans that mimic human driving behavior by optimizing or otherwise adjusting the gains of the one or more cost functions that are already used by the optimization planner of the autonomous vehicle motion planning system.

After such automatic tuning, the autonomous vehicle motion planning system will produce motion plans for the autonomous vehicle that more closely resemble human driving behavior. In particular, the systems and methods of the present disclosure can adjust the cost function gains to approximate a human judgment of the appropriate balance of competing cost features that is implicitly exhibited by the humanly-executed motion plan. Therefore, the autonomous driving performed by the tuned autonomous vehicle will feel more natural and comfortable to a human passenger and/or drivers of adjacent vehicles. Likewise, the time-consuming requirement to manually tune the cost function gains can be eliminated, while producing superior results. In addition, automatic tuning enables the exploration and identification of new cost features. Finally, in example applications, the systems and methods of the present disclosure can train a motion planning system of an autonomous vehicle to generate motion plans that approximate the driving behavior exhibited by the human residents of a particular target geographic area (e.g., Pittsburgh, Pa. versus Phoenix, Ariz.); different human driving behavior profiles (e.g., sporty versus cautious); and/or different driving behaviors exhibited by human operators of different vehicle types (e.g., sedan versus sports utility vehicle versus large truck).

More particularly, in some implementations, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle can include a computing system that assists in controlling the autonomous vehicle. In some implementations, the autonomous vehicle computing system can include a perception system, a prediction system, and a motion planning system that cooperate to perceive the surrounding environment of the autonomous vehicle and determine a motion plan for controlling the motion of the autonomous vehicle accordingly.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the computing system in comprehending and perceiving its surrounding environment and its relationship thereto.

The perception system can identify one or more objects that are proximate to the autonomous vehicle based on sensor data received from the one or more sensors and/or the map data. In particular, in some implementations, the perception system can provide, for each object, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon); class (e.g., vehicle vs. pedestrian vs. bicycle), and/or other state information.

According to an aspect of the present disclosure, the prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system.

The motion planning system can determine a motion plan for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine a motion plan for the autonomous vehicle that best navigates the vehicle relative to the objects at their current and/or future locations.

As an example, in some implementations, the motion planning system operates to generate a new autonomous motion plan for the autonomous vehicle multiple times per second. Each new autonomous motion plan can describe motion of the autonomous vehicle over the next several seconds (e.g., 5 seconds). Thus, in some example implementations, the motion planning system continuously operates to revise or otherwise generate a short-term motion plan based on the currently available data.

In some implementations, the motion planning system can include an optimization planner that, for each instance of generating a new motion plan, searches (e.g., iteratively searches) over a motion planning space (e.g., a vehicle state space) to identify a motion plan that optimizes (e.g., locally optimizes) a total cost associated with the motion plan, as provided by one or more cost functions. For example, the motion plan can include a series of vehicle states and/or a series of controls to achieve the series of vehicle states. A vehicle state can include the autonomous vehicle's current location (also referred to as position); current speed (also referred to as velocity); current acceleration, current heading; current orientation; and/or other state information. As an example, in some implementations, the optimization planner can be or include an iterative linear quadratic regulator or similar iterative solver.

Once the optimization planner has identified the optimal motion plan (or some other iterative break occurs), the optimal candidate motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan until the next motion plan is generated.

According to an aspect of the present disclosure, the motion planning system can employ or otherwise include one or more cost functions that, when evaluated, provide a total cost for a particular candidate motion plan. The optimization planner can search over a motion planning space (e.g., a vehicle state space) to identify a motion plan that optimizes (e.g., locally optimizes) the total cost provided by the one or more cost functions.

In some implementations, different cost function(s) can be used depending upon a particular scenario that is selected by the motion planning system. For example, the motion planning system can include a plurality of scenario controllers that detect certain scenarios (e.g., a changing lanes scenario versus a queueing scenario) and guide the behavior of the autonomous vehicle according to the selected scenario. Different sets of one or more cost functions can correspond to the different possible scenarios and the cost function(s) corresponding to the selected scenario can be loaded and used by the motion planning system at each instance of motion planning.

In addition, according to another aspect of the present disclosure, the one or more cost functions used by the motion planning system can include a plurality of gains. Gains of the one or more cost functions can include coefficients, thresholds, or other configurable parameters of the one or more cost functions. For example, the cost function gains can serve to effectuate a balance between competing concerns (e.g., in the form of cost features) when the motion planning system generates an autonomous motion plan for the autonomous vehicle.

To provide an example for the purpose of illustration: an example cost function can provide, among other costs, a first cost that is negatively correlated to a magnitude of a first distance from the autonomous vehicle to a lane boundary. Thus, if a candidate motion plan approaches a lane boundary, the first cost increases, thereby discouraging (e.g., through increased cost penalization) the autonomous vehicle from selecting motion plans that come close to or cross over lane boundaries. The magnitude of the first distance from the autonomous vehicle to the lane boundary can be referred to as a "feature." The example cost function provides the first cost based on such feature. In particular, the example cost function includes a number of configurable parameters, including, for example, a threshold gain value that describes a certain magnitude of the first distance at which the first cost becomes greater than zero, a coefficient gain value that influences a rate at which the first cost increases as the magnitude of the first distance decreases, and/or other configurable parameters. As another example, the example cost function might provide, among other costs, a second cost that is negatively correlated to a magnitude of a second distance from the autonomous vehicle to a pedestrian. Thus, the motion planning system is discouraged from selecting motion plans that approach pedestrians. Again, the magnitude of the second distance can be referred to as a feature and the cost function can include a number of gains that control the influence of such feature on the total cost. In particular, the respective gains of the second cost and the first cost will effectuate a certain balance between the second cost and the first cost (e.g., it is more important to avoid approaching a pedestrian than it is to avoid crossing a lane boundary).

The example cost function described above is provided only as an example cost function to illustrate the principles of features, gains, and costs. Many other and different cost functions with different features and costs can be employed in addition or alternatively to the example cost function described above. In some optimization-based implementations, the cost function(s) should be C1 continuous in state variables at each time step. In addition, while only a first cost and a second cost are described above with respect to the example cost function, the cost functions of the present disclosure can include any number (e.g., hundreds) of different features, gains, and costs. As examples, additional costs can be assessed based on dynamics, speed limits, crosstrack (e.g., deviation from a center line of a lane), end of path, stop sign, traffic light, adaptive cruise control, static obstacles, etc. In some implementations, the cost function(s) are quadratic, linear, or a combination thereof. Furthermore, in some implementations, the cost function(s) can include a portion that provides a reward rather than a cost. For example, the reward can be of opposite sign to cost(s) provided by other portion(s) of the cost function. Example rewards can be provided for distance traveled, velocity, or other forms of progressing toward completion of a route.

In some instances which contrast with the automatic tuning of the present disclosure, the gains of the cost function(s) can be manually tuned. Adding and tuning gains of a new cost function and/or tuning gains of existing cost function(s) is a tedious and labor/time intensive manual process. Manual tuning can require: designing the cost function; using intuition to come up with some "good" initial guess for the gains of the cost function; running use of the cost function through a simulation; performing a development test; modifying the gains based on the initial results; running use of the cost function through an additional simulation, performing an additional development test; and/or other actions. In particular, this sequence of testing and modifying actions can be repeated indefinitely until the desired behavior emerges. This is a difficult, impractical, and un-scalable process. In particular, as the number of cost functions and/or associated cost features increase, this process becomes extremely complex and interdependent.

In view of the above, the present disclosure provides a framework that enables automatic tuning of cost function gains included in one or more cost functions employed by the autonomous vehicle motion planning system. In particular, the systems and methods of the present disclosure can enable imitation learning based on one or more humanly-executed motion plans that were executed by a human driver during one or more humanly-controlled driving sessions.

Thus, in some implementations, high quality humanly-controlled driving sessions can be identified and selected for use as a "gold-standard" for imitation training of the autonomous vehicle motion planning system. For example, driving sessions can be considered high quality if they illustrate or otherwise exhibit good or otherwise appropriate human driving behavior. Particular humanly-controlled driving sessions can be identified as high quality and selected for use according to any number of metrics including, for example, ride quality scoring metrics. Example ride quality scoring metrics include automated scoring metrics that automatically identify certain driving events (e.g., undesirable events such as jerking events or heavy braking events) and provide a corresponding score and/or manual scoring metrics such as human passenger feedback or scoring based on human passenger feedback. Particular humanly-controlled driving sessions can be also identified as high quality and selected for use according to driver reputation or other factors.

According to an aspect of the present disclosure, one or more session logs can be respectively associated with the one or more humanly-controlled driving sessions that were selected for use in performing automatic tuning. Each session log can include any data that was acquired by the vehicle or its associated sensors during the corresponding driving session. In particular, the session log can include the various types of sensor data described above with reference to the perception system. Thus, even though the vehicle was being manually controlled, the sensors and/or any other vehicle systems can still operate as if the vehicle was operating autonomously and the corresponding data can be recorded and stored in the session log. The session log can also include various other types of data alternatively or in addition to sensor data. For example, the session log can include vehicle control data (e.g., the position or control parameters of actuators that control gas flow, steering, braking, etc.) and/or vehicle state data (e.g., vehicle location, speed, acceleration, heading, orientation, etc.) for any number of timestamps or sampling points.

In some implementations, the session log for each of the one or more humanly-controlled driving sessions can directly include the humanly-executed motion plans that were executed by the human driver during such driving session. For example, the session log can directly include vehicle state data, vehicle control data, and/or vehicle trajectory data that can be sampled (e.g., in a window fashion) to form humanly-executed motion plans.

In other implementations, the humanly-executed motion plans can be derived from the session logs. For example, the session logs may not directly include motion plans but may include information sufficient to derive motion plans. In particular, in some implementations, the automatic tuning systems of the present disclosure can include a trajectory fitter. The trajectory fitter can operate to fit full trajectory profiles to autonomous vehicle partial states. For example, the trajectory fitter can identify the most reliable fields from the logged vehicle states to generate full trajectory profiles (e.g., including higher derivatives) which match the vehicle partial states as closely as possible. As such, the humanly-executed motion plans can be derived from the session logs.

Regardless, the automatic tuning system can obtain one or more humanly-executed motion plans that can be used as a "gold-standard" for imitation training of the autonomous vehicle motion planning system. To perform such imitation training, the automatic tuning system can employ the autonomous vehicle motion planning system to generate autonomous motion plans based on the humanly-controlled driving session logs.

In particular, according to another aspect of the present disclosure, the data from the humanly-controlled driving session logs can be provided as input to an autonomous vehicle computing system, which can include various systems such as, for example, a perception system, a prediction system, and/or a motion planning system as described above. The systems of the autonomous vehicle computing system can process the data from the humanly-controlled driving session logs as if it was being collected by an autonomous vehicle during autonomous operation and, in response to the data from the humanly-controlled driving session logs, output one or more autonomous motion plans. Stated differently, the autonomous vehicle computing system can generate autonomous motion plans as if it were attempting to autonomously operate through the environment described by the data from the humanly-controlled driving session logs. As described above, generating these autonomous motion plans can include implementing an optimization planner to optimize over one or more cost functions that include a plurality of gains. Thus, the autonomous motion plans provide an insight into how the autonomous vehicle would react or otherwise operate in the same situations or scenarios that were encountered by the human driver during the previous humanly-controlled driving sessions.

According to another aspect of the present disclosure, the systems and methods of the present disclosure can automatically tune the cost function gains by minimizing or otherwise optimizing an objective function. In particular, the objective function can provide an objective value based at least in part on a difference between a first total cost associated with the humanly-executed motion plan and a second total cost associated with the autonomous motion plan. As such, evaluating the objective function can include inputting the humanly-executed motion plan into the one or more cost functions of the autonomous vehicle motion planning system to determine the first total cost associated with the humanly-executed motion plan and inputting the autonomous motion plan into the one or more cost functions of the autonomous vehicle motion planning system to determine the second total cost associated with the autonomous motion plan. More particularly, in some implementations, a training dataset can include a plurality of pairs of motion plans, where each pair includes a humanly-executed motion plan and a corresponding autonomous motion plan. The objective function can be optimized over all of the plurality of pairs of motion plans included in the training dataset.

In some implementations, the objective function can be crafted according to an approach known as Maximum Margin Planning. In particular, the objective function can be crafted to enable an optimization approach that allows imitation learning in which humanly-executed motion plan examples are used to inform the cost function gains. In some implementations, the objective function and associated optimization approach can operate according to a number of assumptions. For example, in some implementations, it can be assumed that the one or more cost functions of the autonomous vehicle motion planning system are linear (e.g., linear in its features).

According to another aspect of the present disclosure, in some implementations, the objective function can encode or otherwise include one or more constraints. For example, in some implementations, the objective function can encode a first constraint that the first total cost associated with the humanly-executed motion plan is less than the second total cost associated with the autonomous motion plan. In effect, this first constraint reflects an assumption that the humanly-executed motion plan is optimal. Therefore, any autonomous motion plan generated by the autonomous vehicle motion planning system will necessarily have a higher total cost.

In some implementations, in addition or alternatively to the first constraint described above, the objective function can encode a second constraint that the difference between the first total cost and the second total cost is greater than or equal to a margin. In some implementations, the margin can be based on or equal to a dis-similarity value provided by a loss function. The dis-similarity value can be descriptive of a dis-similarity between the humanly-executed motion plan and the autonomous motion plan. For example, a larger dis-similarity value can indicate that the plans are more dis-similar (i.e., less similar) while a smaller dis-similarity value can indicate that the plans are less dis-similar (i.e., more similar). In some implementations, the loss function can compare the humanly-executed motion plan to the autonomous motion plan and output a real positive number as the dis-similarity value.

In effect, this second constraint that the difference between the first total cost and the second total cost be greater than or equal to the margin reflects the assumption that, if the plans are dis-similar, then the humanly-executed motion plan is expected to have a significantly lower cost than the corresponding autonomous motion plan. Stated differently, the humanly-executed motion plan is expected to be significantly better in terms of cost if the plans are significantly different. By contrast, if the plans are quite similar, then their respective costs are expected to be relatively close. Thus, a distinction can be made between similar plans and dis-similar plans.

However, in some instances, it may be not be possible to satisfy one or more of the constraints encoded in the objective function. For example, if the margin (e.g., as provided by the loss function) is made relatively strong, it may not be possible to meet the constraints for every pair of plans included in the training dataset. To account for this issue, a slack variable can be included to account for the occasional violation. In particular, when one or more of the constraints are violated, a slack variable penalty can be applied; while no penalty is applied if all constraints are met.

As noted above, the objective function can be minimized or otherwise optimized to automatically tune the cost function gains. That is, the gains can be iteratively adjusted to optimize the objective function and the ultimate gain values that optimize the objective function can themselves be viewed as optimal or otherwise "tuned". In some implementations, the objective function can be convex, but non-differentiable. In some implementations, a subgradient technique can be used to optimize the objective function. In some implementations, the objective function can enable guaranteed convergence to an optimal value for a small enough step size. In some implementations, optimization of the objective function can be similar to stochastic gradient descent with the added concept of margins.

In some implementations, the automatic tuning system can identify and reject or otherwise discard outlying pairs of motion plans. In particular, in one example, if the dissimilarity value (or some other measure of similarity) for a given pair of humanly-executed plan and corresponding autonomous motion plan exceeds a certain value, such pair of plans can be identified as an outlier and removed from the training dataset. As another example, if the difference between the total costs respectively associated with a given pair of humanly-executed plan and corresponding autonomous motion plan exceeds a certain value, then such pair of plans can be identified as an outlier and removed from the training dataset. One reason for such outlier identification is that, as described above, different cost function(s) can be used depending upon a particular scenario that is selected by the motion planning system (e.g., a changing lanes scenario versus a queueing scenario). Thus, if the autonomous vehicle motion planning system selected a different scenario than was performed by the human driver, then the automatic tuning system will be unable to match such pair of plans. As yet another example of outlier identification, if the optimization planner fails to converge, the corresponding data and humanly-executed plan can be removed from the dataset.

Thus, the present disclosure provides a framework that enables automatic tuning of cost function gains included in one or more cost functions employed by an autonomous vehicle motion planning system. One technical effect and benefit of the present disclosure is improved control of and performance by autonomous vehicles. In particular, since the systems and methods of the present disclosure can adjust the cost function gains to approximate a human judgment of the appropriate balance of competing cost features, the autonomous driving performed by the tuned autonomous vehicle will feel more natural and comfortable to a human passenger and, further, will more closely meet the expectations of the human drivers of adjacent vehicles.

As another technical effect and benefit, the time-consuming requirement to manually tune the cost function gains can be eliminated, while producing superior tuning results. As another technical effect and benefit, automatic tuning enables the exploration and identification of new cost features. For example, newly created features can easily be introduced and tuned, without disrupting the highly interdependent cost balance of all other features. Likewise, if an automatically tuned autonomous vehicle motion planning is unable to approximate human driving performance, it can be assumed that certain features that are important to human drivers are simply not reflected in the existing cost function. Therefore, the present disclosure provides automatic detection of such instances which can lead to improved identification and formulation of cost features.

Another example technical effect and benefit provided in at least some implementations of the present disclosure leverages the unique and novel concept of applying optimization principles to the cost functions of a linear quadratic regulator-based motion planner. In particular, the gains of the existing cost function structure used by the linear quadratic regulator can be optimized based on human driving data. Thus, rather than learning to mimic trajectories, the linear quadratic regulator-based motion planner can learn a cost structure that guides or causes selection of optimal trajectories.

Furthermore, in one example application, the systems and methods of the present disclosure can train a motion planning system of an autonomous vehicle to generate motion plans that approximate the driving behavior exhibited by the human residents of a particular target geographic area. For example, an existing autonomous vehicle motion planning system may have been tuned (e.g., automatically and/or manually) based on driving data or other testing data associated with a first geographic area. Thus, based on such tuning, the autonomous vehicle may be capable of approximating good human driving performance in such first geographic area.

However, the residents of different geographic areas have different driving styles. In addition, different geographic areas present different driving scenarios and challenges. Thus, an autonomous vehicle specifically tuned for performance in a first geographic area may exhibit decreased performance quality when autonomously driving in a second geographic area that is different than the first geographic area.

Thus, in one example application of the present disclosure, the gains of the autonomous vehicle motion planning system can be automatically tuned based on humanly-controlled driving session logs (and corresponding humanly-executed motion plans) that were collected during humanly-controlled driving sessions that were performed in a target geographic area (e.g., the second geographic area).

To provide an example for the purpose of illustration, an autonomous vehicle motion planning system tuned based on data and testing in Pittsburgh, Pa., USA may approximate human driving behavior that is appropriate in Pittsburgh. However, in some instances, such vehicle may not approximate the human driving behavior that is commonplace and appropriate in Manila, Philippines. For example, human drivers in Manila may be less averse to changing lanes, drive closer together, accelerate/decelerate faster, etc. Thus, to automatically tune the autonomous vehicle for autonomous driving in Manila, a human driver can operate a vehicle in Manila to generate a humanly-controlled session log that is indicative of appropriate human driving behavior in Manila (that is, driving behavior that is "good" driving from the perspective of a Manila resident or driver). The cost function gains of the autonomous vehicle can be automatically tuned based on such Manila session logs. After tuning, the autonomous vehicle motion planning system can generate autonomous motion paths that approximate appropriate human driving behavior in Manila. In other implementations, it is not required that the human driver actually be physically located in Manila, but instead that the driver simply operate the vehicle in the style of the residents Manila to generate the Manila session logs.

According to another aspect, a plurality of sets of tuned gains that respectively correspond to a plurality of different locations can be stored in memory. A particular set of gains can be selected based on the location of the autonomous vehicle and the selected set of gains can be loaded into the autonomous vehicle motion planning system for use, thereby enabling an autonomous vehicle to change driving behavior based on its current location.

In another example application of the present disclosure, the systems and methods of the present disclosure can train a motion planning system of an autonomous vehicle to generate motion plans that approximate one of a plurality of different human driving behavior profiles. For example, human drivers can be requested to operate vehicles according to different human driving behavior profiles (e.g., sporty versus cautious). A corpus of humanly-controlled session logs can be collected for each driving behavior profile. Thereafter, the cost function gains of an autonomous vehicle motion planning system can be automatically tuned to approximate one of the driving behavior profiles. For example, the cost function gains of an autonomous vehicle motion planning system can be automatically tuned based on session logs that correspond to sporting human driving behavior. Thereafter, the tuned autonomous vehicle motion planning system can generate autonomous motion plans that fit the sporty driving behavior profile.

In one example implementation of the above, a plurality of different sets of gains that respectively correspond to the different human driving behavior profiles can be respectively automatically tuned and then stored in memory. A passenger of the autonomous vehicle can select (e.g., through an interface of the autonomous vehicle) which of the human driving behavior profiles they would like to autonomous vehicle to approximate. In response, the autonomous vehicle can load the particular gains associated with the selected behavior profile and can generate autonomous motion plans using such gains. Therefore, a human passenger can be given the ability to select the style of driving that she prefers.

In another example application of the present disclosure, the systems and methods of the present disclosure can train a motion planning system of an autonomous vehicle to generate motion plans that approximate driving behaviors exhibited by human operators of different vehicle types (e.g., sedan versus sports utility vehicle versus delivery truck). For example, human drivers can be requested to operate different vehicle types or models. A corpus of humanly-controlled session logs can be collected for each vehicle type or model. Thereafter, the cost function gains of an autonomous vehicle motion planning system can be automatically tuned to approximate human driving of one of the vehicle types or model. For example, the cost function gains of an autonomous vehicle motion planning system can be automatically tuned based on session logs that correspond to human operation of a delivery truck.

To provide an example for the purpose of illustration, an autonomous vehicle motion planning system tuned based on data and testing performed by a sedan may approximate human driving behavior that is appropriate for driving a sedan. However, in some instances, such motion planning system may not provide autonomous motion plans that are appropriate for a large truck. For example, human drivers of large trucks might take wider turns, leave more space between the nearest vehicle, apply braking earlier, etc. Thus, to automatically tune the autonomous vehicle motion planning system for use in a large truck, a human driver can operate a large truck to generate a humanly-controlled session log that is indicative of appropriate human driving behavior in a large truck. The cost function gains of the autonomous vehicle can be automatically tuned based on such large truck human driving session logs. After tuning, the autonomous vehicle motion planning system can generate autonomous motion paths that approximate appropriate human driving behavior for large trucks, rather than sedans.

Thus, the present disclosure provides techniques that enable a computing system to automatically tune cost function of gains, which was heretofore unobtainable using existing computers or control systems. Therefore, the present disclosure improves the operation of an autonomous vehicle computing system and the autonomous vehicle it controls. Stated differently, the present disclosure provides a particular solution to the problem of tuning cost function gains and provides a particular way to achieve the desired outcome.

According to another aspect, the present disclosure provides distributed computing systems and methods that enable faster and more efficient training of an autonomous vehicle motion planning system based on human-driven examples. In particular, the present disclosure provides distributed computing systems and methods which enable the automatic tuning techniques described above to be performed at scale on a very large amount of example training data. To do so, the present disclosure provides solutions to a number of barriers to scaling.

More particularly, as described above, the present disclosure provides automatic tuning techniques that can be used to tune autonomous vehicle parameters (e.g., cost functions gains) so that an autonomous vehicle motion planning system generates motion plans that imitate human-driven examples (e.g., as contained in vehicle logs from manually driven sessions). However, given the large amount of data associated with each training example, in some instances it can require an undesirable amount of time for a single computing machine to process a large enough number of training examples to result in an optimally tuned set of parameters.

As an example, a single machine implementing the automatic tuning techniques of the present disclosure may require one or several days to process (e.g., learn from) a dataset of 2,000 example humanly-executed motion plans. While the results of this single-machine training session are state-of-the-art and outperform manual tuning by engineers, still superior results can be obtained by learning over a larger number of training examples (e.g., upwards of 10 million logs). However, given the current state of computing technology, processing over millions of logs is generally not practical using a single machine.

As such, the present disclosure provides distributed computing systems and methods which enable the automatic tuning techniques of the present disclosure to be performed at scale on a very large amount of example training data (e.g., upwards of 10 million logs). In one example, a distributed computing system can include a plurality of computing nodes running in parallel, where each computing node executes the automatic tuning techniques of the present disclosure on a respective partition (e.g., subset) of the training data, thereby generating a respective set of tuned values for the cost function gain(s). For example, each computing node can generate a gain vector that contains gain values tuned on the corresponding partition of the training data. The gain vectors from all of the computing nodes can be collected by a central computing device and aggregated (e.g., through averaging) to generate a final gain vector that includes a final set of values for the cost function gain(s). As one example benefit of such distributed computing environment, the motion planning system of the autonomous vehicle can be tuned over several orders of magnitude more training data, thereby enhancing the accuracy and robustness of trained system. Furthermore, in some implementations, the distributed computing system can converge to the same final gain values as would be achieved using a single machine implementation.

A number of technical barriers to scaling the automatic tuning techniques exist and are overcome by aspects of the present disclosure. A first example barrier to scaling is the challenge of simultaneously learning from multiple examples. To resolve this barrier, the present disclosure proposes to partition the examples (e.g., randomly partition) in partitions and then implement the automatic tuning techniques independently on each partition by respective computing devices. If certain distributed learning algorithms (e.g., parallelized stochastic gradient descent) are employed, the average of the outputs from each partition will converge to the same answer that would have been obtained by optimizing over the entire dataset on a single machine. To enable this result, the systems and methods of the present disclosure generate partitions that each contain a sufficient number of examples to obtain a meaningful result (e.g., 2,000). In addition, in some implementations, the training examples can be partitioned in a random fashion.

In particular, uniform randomness among training data partitions can be a requirement of certain distributed learning algorithms to achieve similar convergence results to single machine implementations. As one example, in some implementations, the systems and methods of the present disclosure can satisfy this uniform randomness requirement by constructing an integer array the same length as the training dataset, with each partition index repeated as many times as the number of examples for that partition. Shuffling this array is sufficient to achieve uniform randomness. In particular, each training example can be paired with the corresponding element of the shuffled array and then sent to the particular partition indicated by its paired array element.

Another barrier to scale is the need to send each training example to its randomly chosen destination partition. The time cost of performing this step is proportional to the number of training examples, and doing them in series can easily take days for just a few million training examples. To overcome this barrier, the systems and methods of the present disclosure can parallelize this step with a two-stage process (neglecting the shuffling of the integer array, which can be done virtually instantaneously).

In a first stage, a central computing device divides the list of training example-destination pairs into chunks, and assigns these chunks to jobs which can be run simultaneously. For example, each job can include simply writing each training example in the corresponding chunk to a sub-folder that corresponds to that example's destination partition.

In a second stage, one job is created per partition and all of the training examples are aggregated into a single dataset object. This stage typically cannot be parallelized arbitrarily, since there is at most one job per partition. However, since the amount of data processed is equivalent to a single instance of automatic tuning on a smaller dataset, it presents no barrier to scaling. This two-stage approach makes routing the training examples a matter of minutes rather than days.

Another scaling barrier is the size of the training dataset, which can, in some implementations, be as large as several million training examples (or, equivalently, many thousands of driven miles). A training dataset of this size typically occupies several terabytes, or even more, which can result in a scenario in which the entire dataset of training examples cannot fit simultaneously into a single memory. As such, according to an aspect of the present disclosure, the training examples can be extracted from multiple different sections of multiple logs. In particular, the training examples can be extracted from these sections in parallel, producing relatively small outputs of several gigabytes each. To construct the aggregated dataset, the present disclosure provides an abstraction which mimics the interface of these "simple" dataset objects. This abstraction, which can be referred to as a sharded dataset abstraction, simply keeps track of the filenames, and deserializes each only when needed. In some implementations, virtually all of the code which processes datasets (such as the instructions to implement the automatic tuning techniques) runs without modification when presented with the sharded dataset abstraction, differing only in performance (especially memory footprint).

Finally, according to another aspect, the systems and methods of the present disclosure can cache the number of plans inside each individual dataset object which the sharded automatic tuning dataset abstraction reads. This is because, in some implementations, the distributed tuning computing system needs to know exactly how many training examples it is processing (e.g., in order to shuffle them uniformly randomly). Without this caching, it can take many hours just to count the training examples, since deserializing the individual files is a computationally expensive operation. The caching reduces this to minutes, as long as this cached value is written when each individual shard is created.

Thus, the present disclosure provides distributed computing systems and methods that include and/or leverage solutions to a number of different scaling barriers. As one example, when a computing system extracts individual training examples and stores the shards, the computing system can also caches the total number of examples in each shard. As another example, the computing system can include or provide an abstraction that enables a dataset to be split across arbitrarily many files exactly the same as a single-file dataset. The present disclosure also provides a unique solution for generating a random shuffling of training examples into partitions. As another example solution, after shuffling the examples, the computing system can write the training examples individually to destination-numbered folders, and then aggregate the contents of each folder, which are both highly parallelizable steps. What follows is a simple MapReduce operation, where each individual computing node performs the automatic tuning techniques of the present disclosure on a single partition, and the results from these nodes are aggregated (e.g., averaged). The end result is that the only limit to the ability to scale the automatic tuning provided by the present disclosure is the number of cluster jobs that can be run simultaneously.

With reference now to the Figures, example embodiments of the present disclosure will be discussed in further detail.

Example Devices and Systems

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information. According to one example notation, the state of the vehicle x can be within a state space S. That is, x∈S.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

In particular, according to an aspect of the present disclosure, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

More particularly, to evaluate the one or more cost functions, the motion planning system 105 can determine a plurality of features that are within a feature space. For example, the status of each feature can be derived from the state of the vehicle and/or the respective states of other objects or aspects of the surrounding environment. According to one example notation, the plurality of features are within a feature space as follows: $F_x \in F$.

The motion planning system 105 can determine the plurality of features for each vehicle state included in the current candidate motion plan. In particular, according to one example notation, a candidate motion plan P can be expressed as a series of vehicle states, as follows: $P=\{x_0, \ldots, x_n\}$. The motion planning system 105 can determine the plurality of features for each vehicle state included in the candidate motion plan.

The motion planning system 105 can evaluate one or more cost functions based on the determined features. For example, in some implementations, the one or more cost functions can include a respective linear cost for each feature at each state. According to one example notation, the linear cost for the features at each state can be expressed as follows: $C(F_x)=w^T F_x$, where $w^T$ are a set of cost function gains. Although gains $w^T$ are used as coefficients in the example linear cost function, gains of the one or more cost functions can also include thresholds or other configurable parameters of the one or more cost functions that, for example, serve to effectuate a balance between competing concerns (e.g., in the form of cost features $F_x$) when the motion planning system generates an autonomous motion plan for the autonomous vehicle.

Thus, according to one example notation, and in some implementations, the total cost of a candidate motion plan can be expressed as follows:

$$C(P) = \sum_{x \in P} C(F_x) = \sum_{x \in P} w^T F_x$$

The motion planning system 105 can iteratively optimize the one or more cost functions to minimize a total cost associated with the candidate motion plan. For example, the motion planning system 105 can include an optimization planner that iteratively optimizes the one or more cost functions.

Following optimization, the motion planning system 105 can provide the optimal motion plan to a vehicle controller 106 that controls one or more vehicle controls 107 (e.g., actuators or other devices that control gas flow, steering, braking, etc.) to execute the optimal motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2:
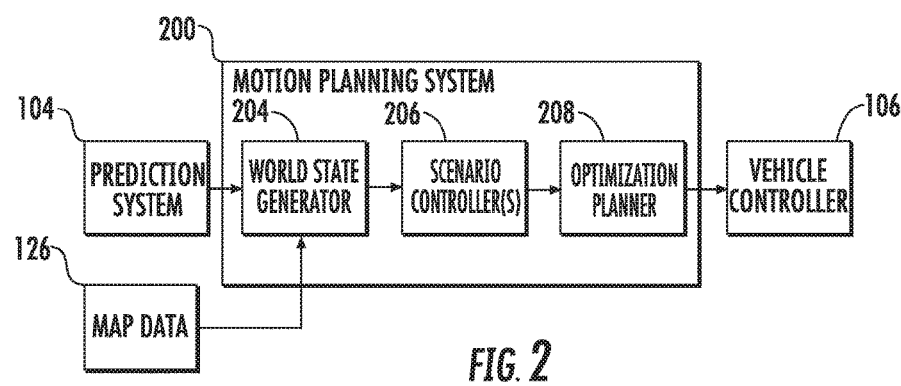
FIG. 2 depicts a block diagram of an example motion planning system according to example embodiments of the present disclosure.

FIG. 2 depicts a block diagram of an example motion planning system 200 according to example embodiments of the present disclosure. The example motion planning system 105 includes a world state generator 204, one or more scenario controllers 206, and an optimization planner 208.

The world state generator 204 can receive information from the prediction system 104, the map data 126, and/or other information such as vehicle pose, a current route, or other information. The world state generator 204 can synthesize all received information to produce a world state that describes the state of all objects in and other aspects of the surrounding environment of the autonomous vehicle at each time step.

The scenario controller(s) 206 can detect certain scenarios (e.g., a changing lanes scenario versus a queueing scenario) and guide the behavior of the autonomous vehicle according to the selected scenario. Thus, the scenario controller(s) can make discrete-type decisions (e.g., should the autonomous vehicle turn left, turn right, change lanes, etc.) and can control motion of the vehicle based on such decisions. In some implementations, each of the scenario controller(s) 206 can be a classifier (e.g., a machine-learned classifier) designed to classify the current state of the world as either included or excluded from one or more corresponding scenarios. In some implementations, the scenario controller(s) 206 can operate at each time step.

As examples, the scenario controllers 206 can include one or more of: a pass, ignore, queue controller that decides, for each object in the world, whether the autonomous vehicle should pass, ignore, or queue such object; a yield controller that decides, for each adjacent vehicle in the world, whether the autonomous vehicle should yield to such vehicle; a lane change controller that identifies whether and when to change lanes; and/or a speed regressor that determines an appropriate driving speed for each time step. These scenario controllers 206 are provided as examples only. Alternative and/or additional scenario controllers 206 can be used. In some implementations of the present disclosure, the motion planning system 200 does not include or implement the scenario controllers 206.

According to another aspect of the present disclosure, the motion planning system 200 can include an optimization planner 208 that searches (e.g., iteratively searches) over a motion planning space (e.g., an available control space) to identify a motion plan that optimizes (e.g., locally optimizes) a total cost associated with the motion plan. For example, the optimization planner can iteratively evaluate and modify a candidate motion plan until the total cost is optimized.

Figure 3:
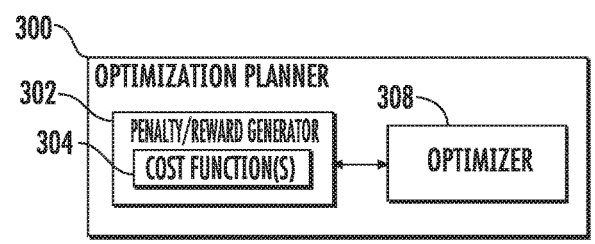
FIG. 3 depicts a block diagram of an example optimization planner according to example embodiments of the present disclosure.

FIG. 3 depicts a block diagram of an example optimization planner 300 according to example embodiments of the present disclosure. As described above, the optimization planner 300 can iteratively search over a motion planning space (e.g., an available control space) to identify a motion plan that optimizes (e.g., locally optimizes) a total cost associated with the motion plan. In particular, the example optimization planner 300 can implement an optimizer 308 to optimize the total cost. The optimizer 308 can be or include a solver (e.g., an iterative solver) or other optimization tool that is able to optimize the total cost. In some implementations, the optimizer 308 is an iterative linear quadratic regulator.

According to an aspect of the present disclosure, the total cost can be based at least in part on one or more cost functions 304. In one example implementation, the total cost equals the sum of all costs minus the sum of all rewards and the optimization planner attempts to minimize the total cost.

In some implementations, different cost function(s) 304 can be used depending upon a particular scenario that is provided to the optimization planner 300. For example, as described above, a motion planning system can include a plurality of scenario controllers that detect certain scenarios (e.g., a changing lanes scenario versus a queueing scenario) and guide the behavior of the autonomous vehicle according to the selected scenario. Different sets of one or more cost functions 304 can correspond to the different possible scenarios and a penalty/reward generator can load the cost function(s) 304 corresponding to the selected scenario at each instance of motion planning. In other implementations, the same cost function(s) 304 can be used at each instance of motion planning (e.g., no particular scenarios are used). In some implementations, the optimization planner 300 does not include the penalty/reward generator 302.

To provide an example cost function 304 for the purpose of illustration: a first example cost function can provide a first cost that is negatively correlated to a magnitude of a first distance from the autonomous vehicle to a lane boundary. Thus, if a candidate motion plan approaches a lane boundary, the first cost increases, thereby discouraging (e.g., through increased cost penalization) the autonomous vehicle from selecting motion plans that come close to or cross over lane boundaries. This first example cost function is provided only as an example cost function to illustrate the principle of cost. The first cost function is not required to implement the present disclosure. Many other and different cost functions 304 can be employed in addition or alternatively to the first cost function described above.

Furthermore, in some implementations, the cost function(s) can include a portion that provides a reward rather than a cost. For example, the reward can be of opposite sign to cost(s) provided by other portion(s) of the cost function. Example rewards can be provided for distance traveled, velocity, or other forms of progressing toward completion of a route.

Referring again to FIG. 2, once the optimization planner 208 has identified the optimal candidate motion plan (or some other iterative break occurs), the optimal candidate motion plan can be selected and executed by the autonomous vehicle. For example, the motion planning system 200 can provide the selected motion plan to a vehicle controller 106 that controls one or more vehicle controls (e.g., actuators that control gas flow, steering, braking, etc.) to execute the selected motion plan.

Each of the world state generator 204, scenario controller(s) 206, the optimization planner 208, and penalty/reward generator 302 can include computer logic utilized to provide desired functionality. In some implementations, each of world state generator 204, scenario controller(s) 206, the optimization planner 208, and penalty/reward generator 302 can be implemented in hardware, firmware, and/or software controlling a general purpose processor. For example, in some implementations, each of world state generator 204, scenario controller(s) 206, the optimization planner 208, and penalty/reward generator 302 includes program files stored on a storage device, loaded into a memory and executed by one or more processors. In other implementations, each of world state generator 204, scenario controller(s) 206, the optimization planner 208, and penalty/reward generator 302 includes one or more sets of computer-executable instructions that are stored in a tangible computer-readable storage medium such as RAM hard disk or optical or magnetic media.

Figure 4:
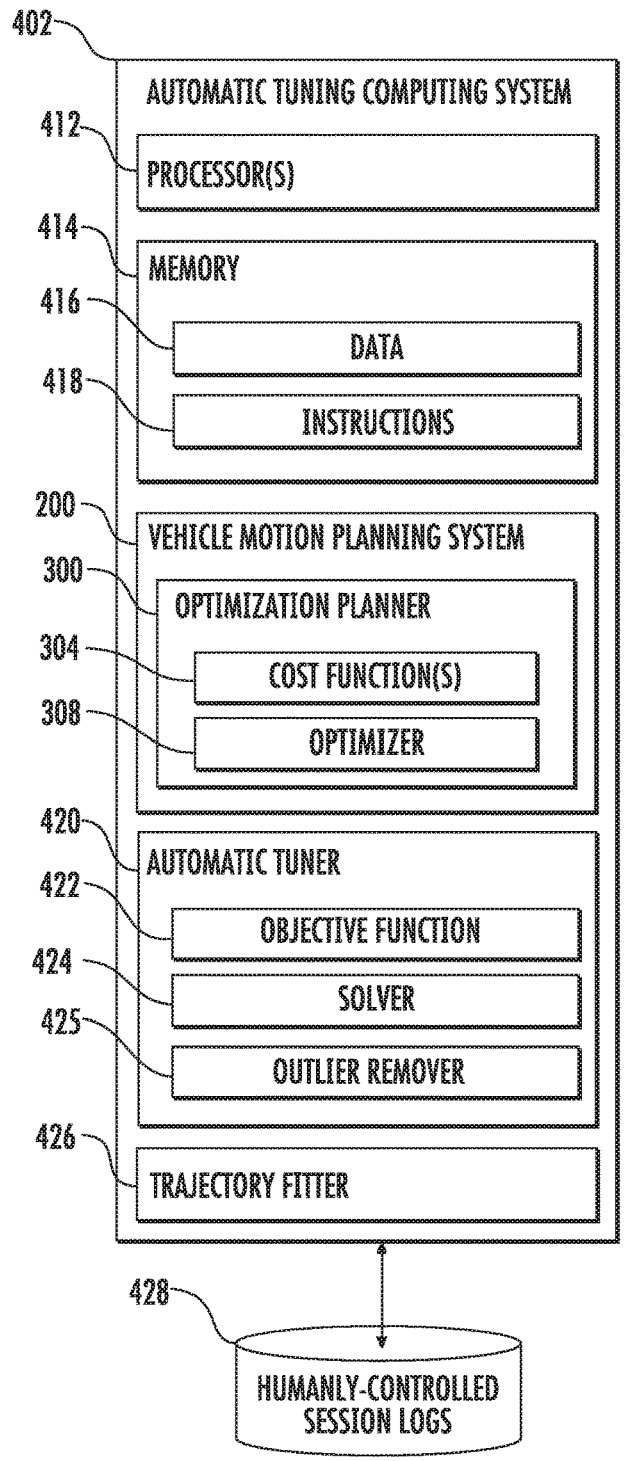
FIG. 4 depicts a block diagram of an example automatic tuning computing system according to example embodiments of the present disclosure.

FIG. 4 depicts a block diagram of an example automatic tuning computing system 402 according to example embodiments of the present disclosure. The automatic tuning computing system 402 can automatically tune the cost function gains of one or more cost functions 304. The automatic tuning computing system 402 can include or otherwise be implemented by one or more discrete computing devices. For example, some aspects of the computing system 402 can be implemented by a first device while other aspects of the system 402 are implemented by a second device.

The automatic tuning computing system 402 includes one or more processors 412 and a memory 414. The one or more processors 412 can be any suitable processing device (e.g., a processor core, a microprocessor, an ASIC, a FPGA, a controller, a microcontroller, etc.) and can be one processor or a plurality of processors that are operatively connected. The memory 414 can include one or more non-transitory computer-readable storage media, such as RAM, ROM, EEPROM, EPROM, one or more memory devices, flash memory devices, etc., and combinations thereof.

The memory 414 can store information that can be accessed by the one or more processors 412. For instance, the memory 414 (e.g., one or more non-transitory computer-readable storage mediums, memory devices) can store data 416 that can be obtained, received, accessed, written, manipulated, created, and/or stored. In some implementations, the computing system 402 can obtain data from one or more memory device(s) that are remote from the system 402.

The memory 414 can also store computer-readable instructions 418 that can be executed by the one or more processors 412. The instructions 418 can be software written in any suitable programming language or can be implemented in hardware. Additionally, or alternatively, the instructions 418 can be executed in logically and/or virtually separate threads on processor(s) 412.

For example, the memory 414 can store instructions 418 that when executed by the one or more processors 412 cause the one or more processors 412 to perform any of the operations and/or functions described herein.

The automatic tuning computing system 402 can include or otherwise be in communication with a vehicle motion planning system, such as, for example, the example motion planning system 200 described with reference to FIG. 2. The autonomous vehicle motion planning system can include an optimization planner, such as, for example, the optimization planner 300 described with reference to FIG. 3. The optimization planner 300 can include one or more cost functions 304 and an optimizer 308.

The automatic tuning computing system 402 can include an automatic tuner 420. The computing system 402 can implement the automatic tuner 420 to automatically tune one or more gains of the one or more cost functions 304 of the vehicle motion planning system 200. In particular, the computing system 402 can implement the automatic tuner 420 to automatically tune the cost function gains by minimizing or otherwise optimizing an objective function 422 that provides an objective value based at least in part on a difference in respective total costs between a humanly-executed motion plan and an autonomous motion plan generated by the autonomous vehicle motion planning system 200. For example, the automatic tuner 420 can include and implement a solver 424 to minimize or otherwise reduce the optimization function 422. For example, the solver 424 can be an iterative solver.

Thus, the automatic tuner 420 can enable imitation learning based on one or more humanly-executed motion plans that were executed by a human driver during one or more humanly-controlled driving sessions. In some implementations, high quality humanly-controlled driving sessions can be identified and selected for use as a "gold-standard" for imitation training of the autonomous vehicle motion planning system. For example, driving sessions can be considered high quality if they illustrate or otherwise exhibit good or otherwise appropriate human driving behavior.

Particular humanly-controlled driving sessions can be identified as high quality and selected for use according to any number of metrics including, for example, ride quality scoring metrics. Example ride quality scoring metrics include automated scoring metrics that automatically identify certain driving events (e.g., undesirable events such as jerking events or heavy braking events) and provide a corresponding score and/or manual scoring metrics such as human passenger feedback or scoring based on human passenger feedback. Particular humanly-controlled driving sessions can be also identified as high quality and selected for use according to driver reputation or other factors.

According to an aspect of the present disclosure, one or more session logs 428 can be respectively associated with the one or more humanly-controlled driving sessions that were selected for use in performing automatic tuning. Each session log 428 can include any data that was acquired by the vehicle or its associated sensors during the corresponding driving session. In particular, the session log 428 can include the various types of sensor data described above with reference to the perception system. Thus, even though the vehicle was being manually controlled, the sensors and/or any other vehicle systems can still operate as if the vehicle was operating autonomously and the corresponding data can be recorded and stored in the session log 428.

The session log 428 can also include various other types of data alternatively or in addition to sensor data. For example, the session log 428 can include vehicle control data (e.g., the position or control parameters of actuators that control gas flow, steering, braking, etc.) and/or vehicle state data (e.g., vehicle location, speed, acceleration, heading, orientation, etc.) for any number of timestamps or sampling points.

In some implementations, the session log 428 for each of the one or more humanly-controlled driving sessions can directly include the humanly-executed motion plans that were executed by the human driver during such driving session. For example, the session log 428 can directly include vehicle state data, vehicle control data, and/or vehicle trajectory data that can be sampled (e.g., in a window fashion) to form humanly-executed motion plans.

In other implementations, the humanly-executed motion plans can be derived from the session logs 428. For example, the session logs 428 may not directly include humanly-executed motion plans but may include information sufficient to derive motion plans. As such, in some implementations, the automatic tuning computing system 402 can include a trajectory fitter 426 that devices humanly-executed motion plans from the humanly-controlled session logs 428.

Figure 6:
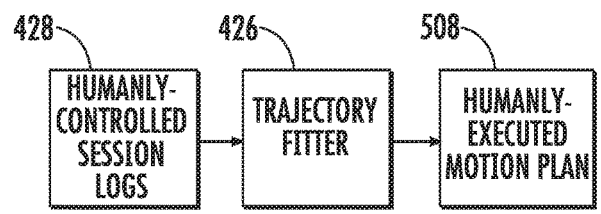
FIG. 6 depicts a block diagram of an example processing pipeline to derive humanly-executed motion plans according to example embodiments of the present disclosure.

In particular, as an example, FIG. 6 depicts a block diagram of an example processing pipeline to derive humanly-executed motion plans according to example embodiments of the present disclosure. In particular, humanly-controlled session logs 428 can be provided to the trajectory fitter 426. The trajectory fitter 426 can operate to fit full trajectory profiles to autonomous vehicle partial states. For example, the trajectory fitter 426 can identify the most reliable fields from the logged vehicle states to generate full trajectory profiles (e.g., including higher derivatives) which match the vehicle partial states as closely as possible. Therefore, the trajectory fitter 426 can derive the humanly-executed motion plans 508 from the session logs 428. However, as described above, in some implementations, the trajectory fitter 426 is not required.

Referring again to FIG. 4, the automatic tuning computing system 402 can obtain one or more humanly-executed motion plans that can be used as a "gold-standard" for imitation training of the autonomous vehicle motion planning system. To perform such imitation training, the automatic tuning computing system 402 can employ the autonomous vehicle motion planning system 200 to generate autonomous motion plans based on the humanly-controlled driving session logs 428. The automatic tuning computing system 402 can automatically tune the cost function gains by minimizing or otherwise optimizing the objective function 422 that provides an objective value based at least in part on a difference in respective total costs between a humanly-executed motion plan and an autonomous motion plan generated by the autonomous vehicle motion planning system. In particular, the automatic tuning computing system 402 can respectively input the humanly-executed motion plan and the autonomous motion plan into the one or more cost functions 304 used by the optimization planner 300 of the autonomous vehicle motion planning system 200 to obtain their respective total costs. The automatic tuning computing system 402 can iteratively adjust the gains of the one or more cost functions 304 to minimize or otherwise optimize the objective function 422.

Figure 5:
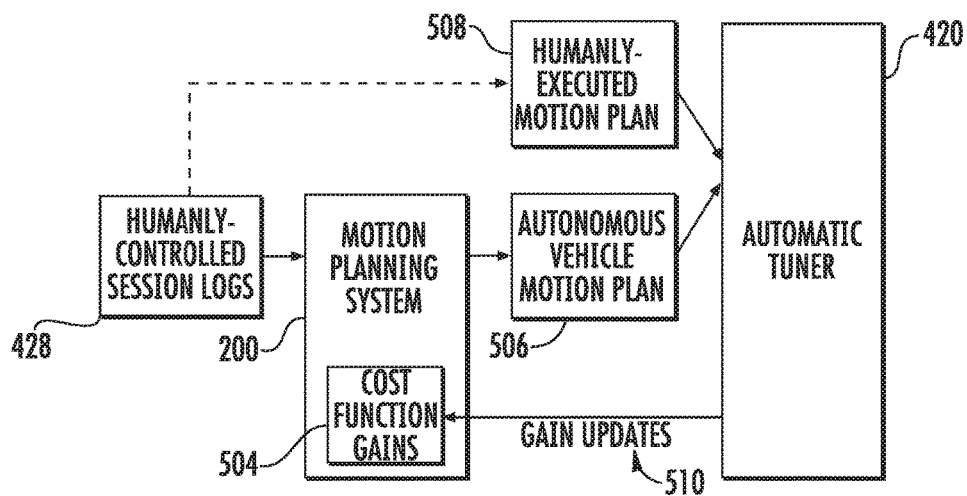
FIG. 5 depicts a block diagram of an example automatic tuning computing system according to example embodiments of the present disclosure.

More particularly, as one example, FIG. 5 depicts a workflow diagram of an example automatic tuning computing system according to example embodiments of the present disclosure. In particular, according to another aspect of the present disclosure, the data from the humanly-controlled driving session logs 428 can be provided as input to an autonomous vehicle computing system, which can include various systems such as, for example, a perception system, a prediction system, and/or a motion planning system 200 as described above. The systems of the autonomous vehicle computing system can process the data from the humanly-controlled driving session logs 428 as if it was being collected by an autonomous vehicle during autonomous operation and, in response to the data from the humanly-controlled driving session logs 428, output one or more autonomous motion plans 506. Stated differently, the autonomous vehicle computing system (e.g., the motion planning system 200) can generate autonomous motion plans 506 as if it were attempting to autonomously operate through the environment described by the data from the humanly-controlled driving session logs 428. As described above, generating these autonomous motion plans 406 can include implementing the optimization planner 300 to optimize over the one or more cost functions 304 that include a plurality of gains 504. Thus, the autonomous motion plans 506 provide an insight into how the autonomous vehicle would react or otherwise operate in the same situations or scenarios that were encountered by the human driver during the previous humanly-controlled driving sessions.

The automatic tuning computing system can also obtain one or more corresponding humanly-executed motion plans 508. For example, the one or more corresponding humanly-executed motion plans 508 can be obtained directly from the humanly-controlled session logs 428 or can be derived from the humanly-controlled session logs 428.

According to another aspect of the present disclosure, the systems and methods of the present disclosure can automatically tune the cost function gains 504 by minimizing or otherwise optimizing the objective function 422. In particular, the objective function 422 can provide an objective value based at least in part on a difference between a first total cost associated with the humanly-executed motion plan 508 and a second total cost associated with the autonomous motion plan 506. As such, evaluating the objective function 422 can include inputting the humanly-executed motion plan 508 into the one or more cost functions 304 of the autonomous vehicle motion planning system 200 to determine the first total cost associated with the humanly-executed motion plan 508 and inputting the autonomous motion plan 406 into the one or more cost functions 304 of the autonomous vehicle motion planning system 200 to determine the second total cost associated with the autonomous motion plan 506. More particularly, in some implementations, a training dataset can include a plurality of pairs of motion plans, where each pair includes a humanly-executed motion plan 508 and a corresponding autonomous motion plan 506. The objective function 422 can be optimized over all of the plurality of pairs of motion plans included in the training dataset.

In some implementations, the objective function 422 can be crafted according to an approach known as Maximum Margin Planning. In particular, the objective function 422 can be crafted to enable an optimization approach that allows imitation learning in which humanly-executed motion plan examples are used to inform the cost function gains 504. In some implementations, the objective function 422 and associated optimization approach can operate according to a number of assumptions. For example, in some implementations, it can be assumed that the one or more cost functions 304 of the autonomous vehicle motion planning system are linear (e.g., linear in their features).

According to another aspect of the present disclosure, in some implementations, the objective function 422 can encode or otherwise include one or more constraints. For example, in some implementations, the objective function 422 can encode a first constraint that the first total cost associated with the humanly-executed motion plan 508 is less than the second total cost associated with the autonomous motion plan 506. In effect, this first constraint reflects an assumption that the humanly-executed motion plan 508 is optimal. Therefore, any autonomous motion plan 506 generated by the autonomous vehicle motion planning system 200 will necessarily have a higher total cost. According to one example notation, in some implementations, this first constraint can be expressed according to the following equation, where $\hat{P}$ refers to the autonomous motion plan 506 and $P_e$ refers to the humanly-executed motion plan 508.

$$\sum_{x \in \hat{P}} w^T F_x - \sum_{x \in P_e} w^T F_x \geq 0$$

In some implementations, in addition or alternatively to the first constraint described above, the objective function 422 can encode a second constraint that the difference between the first total cost and the second total cost is greater than or equal to a margin.

In some implementations, the margin can be based on or equal to a dis-similarity value provided by a loss function $\mathcal{L}(P_e, \hat{P})$. The dis-similarity value can be descriptive of a dis-similarity between the humanly-executed motion plan 508 and the autonomous motion plan 506. For example, a larger dis-similarity value can indicate that the plans are more dis-similar (i.e., less similar) while a smaller dis-similarity value can indicate that the plans are less dis-similar (i.e., more similar). In some implementations, the loss function can compare the humanly-executed motion plan 508 to the autonomous motion plan 506 and output a real positive number as the dis-similarity value.

In effect, this second constraint that the difference between the first total cost and the second total cost be greater than or equal to the margin reflects the assumption that, if the plans are dis-similar, then the humanly-executed motion plan 508 is expected to have a significantly lower cost than the corresponding autonomous motion plan 506. Stated differently, the humanly-executed motion plan 508 is expected to be significantly better in terms of cost if the plans are significantly different. By contrast, if the plans are quite similar, then their respective costs are expected to be relatively close. Thus, a distinction can be made between similar plans and dis-similar plans.

According to one example notation, in some implementations, this second constraint can be expressed according to the following equation.

$$\sum_{x \in \hat{P}} w^T F_x - \sum_{x \in P_e} w^T F_x \geq \mathcal{L}(P_e, \hat{P})$$

However, in some instances, it may be not be possible to satisfy one or more of the constraints encoded in the objective function 422. For example, if the margin (e.g., as provided by the loss function) is made relatively strong, it may not be possible to meet the constraints for every pair of plans included in the training dataset.

As one example, according to one example notation, a violation occurs when the following equation is satisfied.

$$\sum_{x \in P_e} w^T F_x - \left( \sum_{x \in \hat{P}} w^T F_x - \mathcal{L}(P_e, \hat{P}) \right) \geq 0$$

To account for this issue, a slack variable can be included to account for the occasional violation. In particular, when one or more of the constraints are violated, a slack variable penalty can be applied; while no penalty is applied if all constraints are met.

As one example, according to one example notation, the slack variable can be expressed as follows:

$$\xi = \begin{cases} \text{violation} : \text{violation} > 0 \\ 0 : \text{otherwise} \end{cases}$$

Taking the above constraints into account, one example objective function 422 can be derived as follows:

$$\text{Objective: } \operatorname{argmin}_w \left( \lambda \|w\|^2 + \left( \sum_{x \in P_e} w^T F_x - \sum_{x \in \hat{P}} w^T F_x \right) + \mathcal{L}(P_e, \hat{P}) \right)$$

As noted above, the objective function 422 can be minimized or otherwise optimized to automatically tune the cost function gains 504. That is, the gains 504 can be iteratively adjusted (e.g., in the form of iterative gain updates 510) to optimize the objective function 422. The ultimate values of the gains 504 that optimize the objective function 422 can themselves be viewed as optimal or otherwise "tuned".

In some implementations, the objective function 422 can be convex, but non-differentiable. In some implementations, a subgradient technique can be used to optimize the objective function. In some implementations, the objective function 422 can enable guaranteed convergence to an optimal value for a small enough step size. In some implementations, optimization of the objective function 422 can be similar to stochastic gradient descent with the added concept of margins.

Referring again to FIG. 4, in some implementations, the automatic tuning computing system 402 can identify and reject or otherwise discard outlying pairs of motion plans. For example, the automatic tuner 420 can include an outlier remover 425 that identifies and rejects or otherwise discards outlying pairs of motion plans.

In particular, in one example, if the dis-similarity value (or some other measure of similarity) for a given pair of humanly-executed plan and corresponding autonomous motion plan exceeds a certain value, the outlier remover 425 can identify such pair of plans as an outlier and remove them from the training dataset. As another example, if the difference between the total costs respectively associated with a given pair of humanly-executed plan and corresponding autonomous motion plan exceeds a certain value, then the outlier remover 425 can identify such pair of plans as an outlier and remove them from the training dataset. One reason for use of the outlier remover 425 is that, as described above, different cost function(s) 304 can be used depending upon a particular scenario that is selected by the motion planning system 200 (e.g., a changing lanes scenario versus a queueing scenario). Thus, if the autonomous vehicle motion planning system 200 selected a different scenario than was performed by the human driver, then the automatic tuning system 402 will be unable to match such pair of plans. As yet another example of outlier identification, if the optimization planner fails to converge, the outlier remover 425 can remove the corresponding data and humanly-executed plan from the dataset.

According to another aspect of the present disclosure, in some implementations, example embodiments of the present disclosure can include a distributed computing system that includes a plurality of computing nodes that can perform automatic tuning in parallel. For example, each respective computing node can include or implement the automatic tuning computing system 402 illustrated in FIG. 4. Thus, each computing node can separately include or implement a system 402 as illustrated in FIG. 4.

In some implementations, the distributed computing system can further include a central computing device that performs partitioning and management of the training dataset. The central computing device can also manage the computing nodes. The central computing device can include one or more processors (e.g., a processor core, a microprocessor, an ASIC, a FPGA, a controller, a microcontroller, etc.) and a memory (e.g., RAM, ROM, EEPROM, EPROM, flash memory devices, magnetic disks, etc.). In some implementations, the central computing device can include multiple physically distinct computing devices.

More particularly, as described above, the present disclosure provides automatic tuning techniques that can be used to tune autonomous vehicle parameters (e.g., cost functions gains) so that an autonomous vehicle motion planning system generates motion plans that imitate human-driven examples (e.g., as contained in vehicle logs from manually driven sessions). However, given the large amount of data associated with each training example, in some instances it can require an undesirable amount of time for a single computing machine to process a large enough number of training examples to result in an optimally tuned set of parameters.

As an example, a single machine implementing the automatic tuning techniques of the present disclosure may require one or several days to process (e.g., learn from) a dataset of 2,000 example humanly-executed motion plans. While the results of this single-machine training session are state-of-the-art and outperform manual tuning by engineers, still superior results can be obtained by learning over a larger number of training examples (e.g., upwards of 10 million logs). However, given the current state of computing technology, processing over millions of logs is generally not practical using a single machine.

As such, the present disclosure provides distributed computing systems and methods which enable the automatic tuning techniques of the present disclosure to be performed at scale on a very large amount of example training data (e.g., upwards of 10 million logs).

Figure 11:
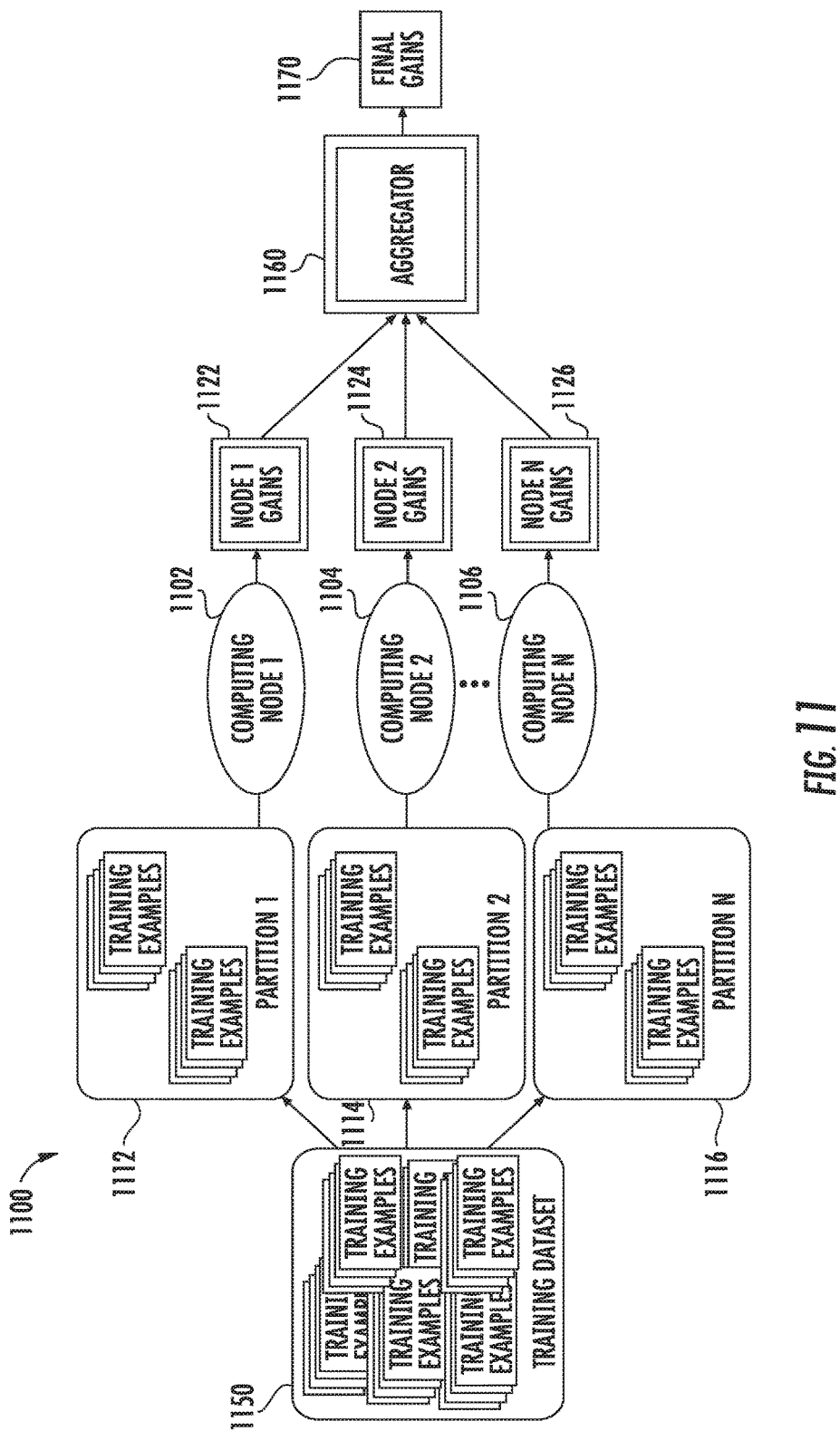
FIG. 11 depicts a block diagram of an example distributed computing system according to example embodiments of the present disclosure.

To provide one simplified example, FIG. 11 depicts an example distributed computing system 1100 according to example embodiments of the present disclosure. The distributed computing system 1100 can include a plurality of computing nodes (e.g., as illustrated at 1102, 1104, and 1106) running in parallel. Any number of computing nodes can be used (e.g., thousands). Computing nodes can each be implemented by respective, independent computing devices or multiple computing nodes can be implemented by a single computing device (e.g., via multi-core processors or virtual machines). In some implementations, the computing nodes can be worker devices in a datacenter or cluster. In some implementations, the computing nodes can be virtual nodes.

Each computing node can execute the automatic tuning techniques of the present disclosure (e.g., as described with reference to FIGS. 4-10) on a respective partition or subset of a training dataset 1150. More particularly, the training dataset 1150 can be partitioned (e.g., by a central computing device that is not specifically illustrated in FIG. 11) into a plurality of partitions (e.g., as illustrated at 1112, 1114, and 1116). Each computing node can independently process one of the partitions in parallel. As examples, node 1102 can process the partition 1112; node 1104 can process the partition 1114; and node 1106 can process the partition 1116. However, the number of partitions is not necessarily required to equal the number of computing nodes.

By performing the automatic tuning techniques of the present disclosure on a partition, each node can generate a respective set of tuned values for the cost function gain(s) (e.g., as illustrated at 1122, 1124, and 1126). For example, each computing node can generate a gain vector that contains gain values tuned on the corresponding partition of the training data. As examples, node 1102 can process the partition 1112 to generate gains 1122; node 1104 can process the partition 1114 to generate gains 1124; and node 1106 can process the partition 1116 to generate gains 1126.

The gain vectors from all of the computing nodes can be collected by an aggregator 1160 and aggregated to generate a set of final gains 1170 (e.g., a final gain vector) that includes a final set of values for the cost function gain(s). The aggregator 1160 can be included in or implemented by the central computing device. The aggregator 1160 can perform aggregation according to un-weighted averaging, weighted averaging, voting, selection based on testing/performance, or other aggregation schemes.

As one example benefit of such distributed computing environment 1100, the motion planning system of the autonomous vehicle can be tuned over several orders of magnitude more training data, thereby enhancing the accuracy and robustness of trained system. Furthermore, in some implementations, the distributed computing system 1100 can converge to the same final gain values 1170 as would be achieved using a single machine implementation.

A number of technical barriers to scaling the automatic tuning techniques exist and are overcome by aspects of the present disclosure. A first example barrier to scaling is the challenge of simultaneously learning from multiple examples. To resolve this barrier, the present disclosure proposes to partition the examples (e.g., randomly partition) in partitions and then implement the automatic tuning techniques independently on each partition by respective computing devices, as generally illustrated by FIG. 11.

If certain distributed learning algorithms (e.g., parallelized stochastic gradient descent) are employed, the average of the outputs from each partition will converge to the same answer that would have been obtained by optimizing over the entire dataset on a single machine. To enable this result, the systems and methods of the present disclosure generate partitions (e.g., 1112, 1114, 1116) that each contain a sufficient number of examples to obtain a meaningful result (e.g., ~2,000 training examples in each partition). In addition, in some implementations, the training examples can be partitioned in a random fashion.

In particular, uniform randomness among training data partitions (e.g., 1112, 1114, 1116) can be a requirement of certain distributed learning algorithms to achieve similar convergence results to single machine implementations. As one example, in some implementations, a central computing device can satisfy this uniform randomness requirement by constructing an integer array that is the same length as the training dataset, with each partition index repeated as many times as the number of examples for that partition. Shuffling this array is sufficient to achieve uniform randomness. In particular, each training example can be paired with the corresponding element of the shuffled array and then sent to the particular partition indicated by its paired array element.

Another barrier to scale is the need to send each training example to its randomly chosen destination partition. The time cost of performing this step is proportional to the number of training examples, and doing them in series can easily take days for just a few million training examples. To overcome this barrier, a central computing device can parallelize this step with a two-stage process (neglecting the shuffling of the integer array, which can be done virtually instantaneously).

Figure 12:
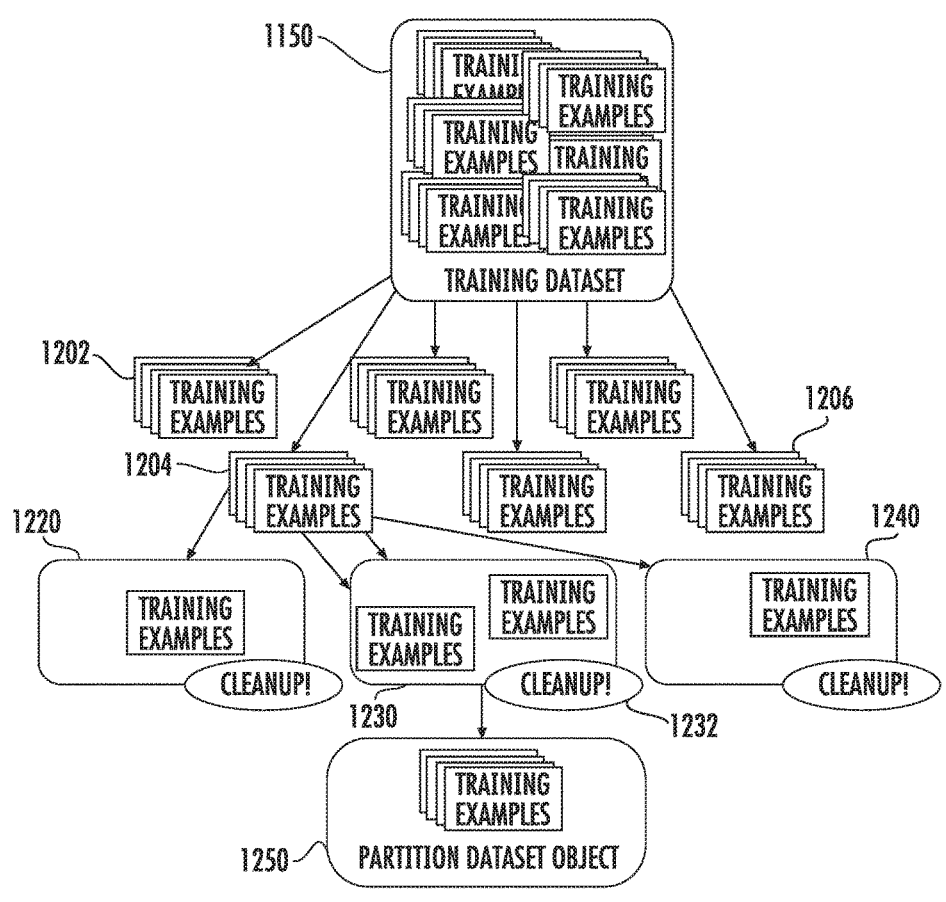
FIG. 12 depicts a block diagram of an example process to generate dataset partitions according to example embodiments of the present disclosure.

To provide one example, FIG. 12 depicts a block diagram of an example process to generate dataset partitions according to example embodiments of the present disclosure. In a first stage, a central computing device divides a list of training example-destination pairs for the training dataset 1150 into chunks (e.g., example chunks 1202, 1204, and 1206). The chunks can be of any size and any number of chunks can be formed (e.g., can be arbitrarily parallelized).

Next, the central computing device can assign these chunks (e.g., 1202, 1204, and 1206) to jobs which can be run simultaneously (e.g., in parallel). For example, each job can include simply writing each training example in the corresponding chunk to a sub-folder (e.g., example subfolders 1220, 1230, and 1240) that corresponds to that example's destination partition. For example, each job can be performed by a worker computing device (e.g., worker device in a datacenter). Worker devices can include processor(s) and memory and can be called to perform jobs (e.g., in a distributed, parallelized fashion).

As an example, the three chunks 1202, 1204, and 1206 can correspond to three jobs that can be performed in parallel. For example, the job for chunk 1204 can include writing each training example in the chunk 1204 to the appropriate sub-folder 1220, 1230, or 1240, as guided by the example's partition assignment.

In a second stage of routing the training examples, the central computing device can create one job per partition in which all of the training examples can be aggregated into a single dataset object. For example, each job can be performed by a worker computing device (e.g., worker device in a datacenter). As an example, all of the training examples included in sub-folder 1230 can be aggregated into a single dataset object 1250. In some instances, this second stage can be referred to as defragmenting into datasets.

This second stage typically cannot be parallelized arbitrarily, since there is at most one job per partition. However, since the amount of data processed is equivalent to a single instance of automatic tuning on a smaller dataset, it presents no barrier to scaling. This two-stage approach makes routing the training examples a matter of minutes rather than days.

According to another aspect of the present disclosure, additional efficiency gains can be achieved by having each defragmenting job clean up its own temporaries. For example, the defragmenting job that aggregated the training examples included in sub-folder 1230 can, once completed, clean up its own temporary data items (e.g., as indicated at 1232). Thus, whereas the cleanup process across all datasets, if left for a single main job, can take a day or more, if each defragmenting job cleans up its own temporaries there is very little for the main job to do, since there are only a number of empty directories. Thus, the main cleanup job can require only a few minutes instead of a day.

Another scaling barrier is the size of the training dataset, which can, in some implementations, be as large as several million training examples (or, equivalently, many thousands of driven miles). A training dataset of this size typically occupies several terabytes, or even more, which can result in a scenario in which the entire dataset of training examples cannot fit simultaneously into a single memory.

Figure 13:
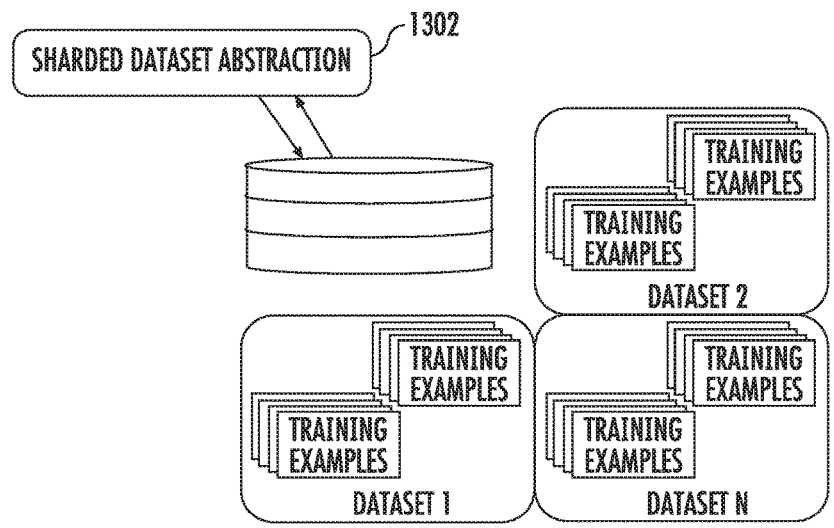
FIG. 13 depicts a block diagram of an example dataset abstraction according to example embodiments of the present disclosure.

As such, according to an aspect of the present disclosure, the training examples can be extracted from multiple different sections of multiple logs. As one example, FIG. 13 depicts a block diagram of an example dataset abstraction according to example embodiments of the present disclosure.

In particular, the training examples can be stored in different datasets, which can be distributed across different physical storage devices. The training examples can be extracted from different sections of multiple logs in parallel, producing relatively small outputs of several gigabytes each.

To construct the aggregated dataset, the present disclosure provides a sharded dataset abstraction 1302 which mimics the interface of these "simple" dataset objects. The abstraction, 1302 can simply keep track of the filenames and deserialize each only when needed. In some implementations, the abstraction 1302 can mimic the interface of a single dataset while providing access to a disk-based alternative.

In some implementations, virtually all of the code which processes datasets (such as the instructions to implement the automatic tuning techniques on each node) runs without modification when presented with the sharded dataset abstraction 1302, differing only in performance (especially memory footprint).

According to another aspect, processing gains can be achieved by loading each node's training examples into memory. Thus, rather than interacting with the disk I/O to respectively obtain individual training examples, which is a very slow process, an entire node's examples can be loaded into the node's memory for processing. As a result, the processing time for each training example can be reduced by 50-500×.

Finally, according to another aspect, the systems and methods of the present disclosure can cache the number of plans inside each individual dataset object which the sharded automatic tuning dataset abstraction 1302 reads. This is because, in some implementations, the distributed computing system needs to know exactly how many training examples it is processing (e.g., in order to shuffle them uniformly randomly).

Figure 14:
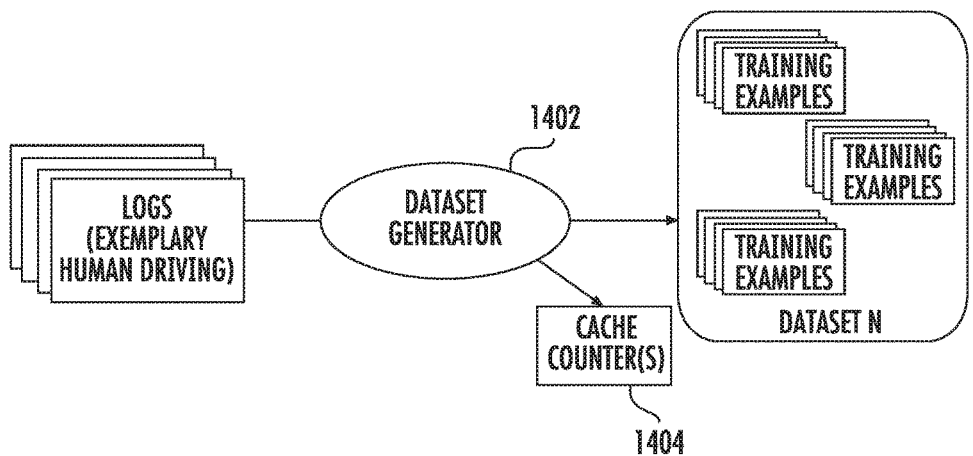
FIG. 14 depicts a block diagram of an example cache counter according to example embodiments of the present disclosure.

To provide one example, FIG. 14 depicts a block diagram of example cache counter(s) according to example embodiments of the present disclosure. As illustrated in FIG. 14, a dataset generator 1402 can maintain and update one or more cache counters 1404 as training examples are generated from driving logs and stored in memory (e.g., stored in particular datasets or shards). In such fashion, the cache counter(s) 1404 can maintain an accurate count of the number of training examples included in the entire training dataset.

In some implementations, a single, central cache counter 1404 can be maintained. In other implementations, multiple cache counters 1404 can be maintained. For example, in some implementations, every dataset shard has its own cache counter 1404. Since these shards can be created in parallel, the per-shard cache counters can also created and/or maintained/incremented in parallel. More generally, the dataset generation illustrated in FIG. 14 can itself be a parallel process (e.g., multiple parallel dataset generators 1402 can be employed). In some implementations, a total count can be obtained by determining a sum of the individual per-shard counters across all shards included in the (logical) full dataset.

Without the caching described above, it can take many hours just to count the training examples, since deserializing the individual files is a computationally expensive operation. The caching reduces this to minutes, as long as this cached value is written when each individual shard is created.

Thus, the present disclosure provides distributed computing systems and methods that include and/or leverage solutions to a number of different scaling barriers. As one example, when a computing system extracts individual training examples and stores the shards, the computing system can also caches the total number of examples in each shard. As another example, the computing system can include or provide an abstraction that enables a dataset to be split across arbitrarily many files exactly the same as a single-file dataset. The present disclosure also provides a unique solution for generating a random shuffling of training examples into partitions. As another example solution, after shuffling the examples, the computing system can write the training examples individually to destination-numbered folders, and then aggregate the contents of each folder, which are both highly parallelizable steps. What follows is a simple MapReduce operation, where each individual computing node performs the automatic tuning techniques of the present disclosure on a single partition, and the results from these nodes are aggregated (e.g., averaged). The end result is that the only limit to the ability to scale the automatic tuning provided by the present disclosure is the number of cluster jobs that can be run simultaneously.

Example Methods

Figure 7:
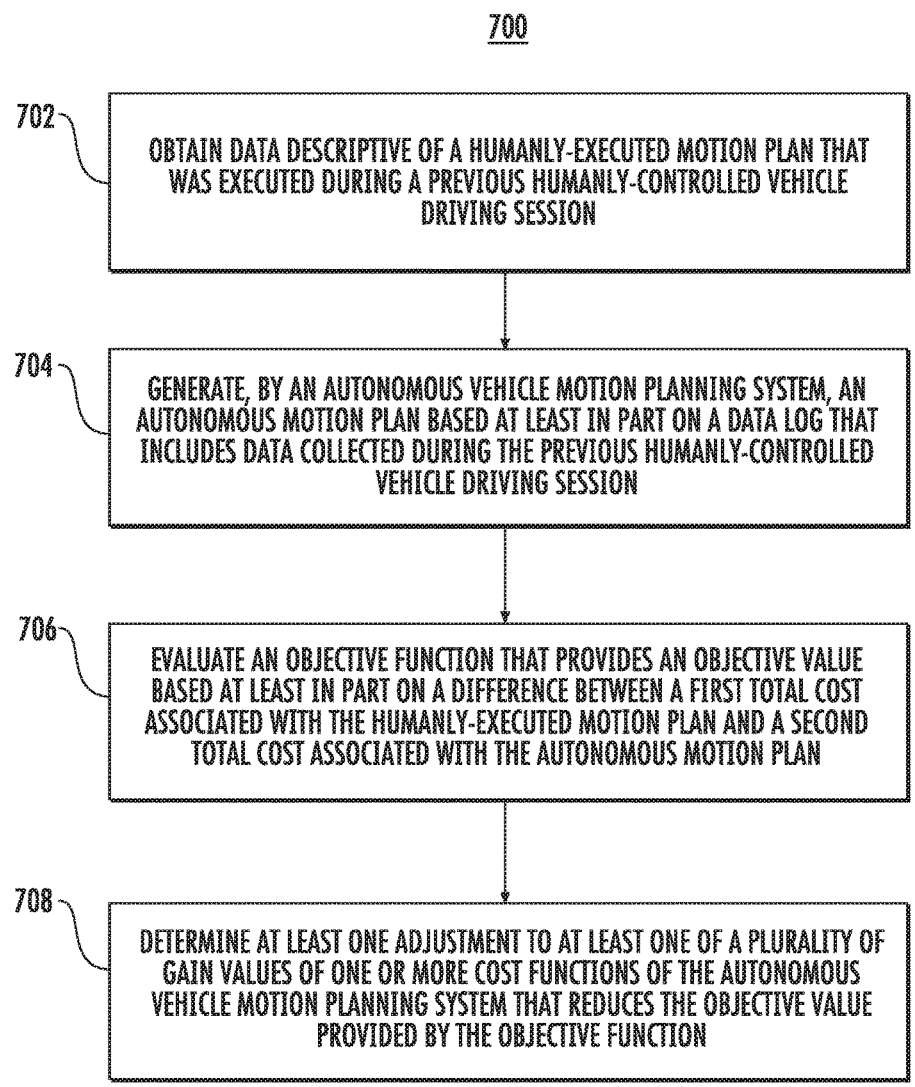
FIG. 7 depicts a flowchart diagram of an example method to automatically tune cost function gains according to example embodiments of the present disclosure.

FIG. 7 depicts a flowchart diagram of an example method 700 to automatically tune cost function gains according to example embodiments of the present disclosure.

At 702, a computing system obtains data descriptive of a humanly-executed motion plan that was executed during a previous humanly-controlled vehicle driving session. For example, the data descriptive of the humanly-executed motion plan can be obtained or derived from a data log that includes data collected during the previous humanly-controlled vehicle driving session. For example, the data log can include state data for the humanly-controlled vehicle.

In some implementations, obtaining the data descriptive of the humanly-executed motion plan at 702 can include obtaining the data log that includes the data collected during the previous humanly-controlled vehicle driving session and fitting a trajectory to the state data for the humanly-controlled vehicle to obtain the humanly-executed motion plan.

At 704, an autonomous vehicle motion planning system generates an autonomous motion plan based at least in part on the data log that includes the data collected during the previous humanly-controlled vehicle driving session. For example, generating the autonomous motion plan can include evaluating one or more cost functions that include a plurality of gains. In particular, the autonomous vehicle motion planning system can optimize over the one or more cost functions to generate the autonomous motion plan.

At 706, the computing system evaluates an objective function that provides an objective value based at least in part on a difference between a first total cost associated with the humanly-executed motion plan and a second total cost associated with the autonomous motion plan. In particular, evaluating the objective function at 706 can include inputting the humanly-executed motion plan into the one or more cost functions of the autonomous vehicle motion planning system to determine the first total cost associated with the humanly-executed motion plan; and inputting the autonomous motion plan into the one or more cost functions of the autonomous vehicle motion planning system to determine the second total cost associated with the autonomous motion plan.

In some implementations, the objective function can encode a first constraint that the first total cost associated with the humanly-executed motion plan is less than the second total cost associated with the autonomous motion plan. In some implementations, evaluating the objective function at 706 can include applying a slack variable violation when the first constraint is violated.

In some implementations, the objective function can encode a second constraint that the difference between the first total cost and the second total cost is greater than or equal to a margin. In some implementations, the margin is based at least in part on or equal to a dis-similarity value that is descriptive of a dis-similarity between the humanly-executed motion plan and the autonomous motion plan. For example, the dis-similarity value can be provided by a loss function. In some implementations, evaluating the objective function at 706 can include applying a slack variable violation when the second constraint is violated.

At 708, the computing system determines at least one adjustment to at least one of the plurality of gains values of the one or more cost functions of the autonomous vehicle motion planning system that reduces the objective value provided by the objective function.

In some implementations, determining the at least one adjustment to the at least one of the plurality of gain values at 708 can include iteratively optimizing the objective function. As an example, iteratively optimizing the objective function can include performing a subgradient technique to iteratively optimize the objective function.

Figure 8:
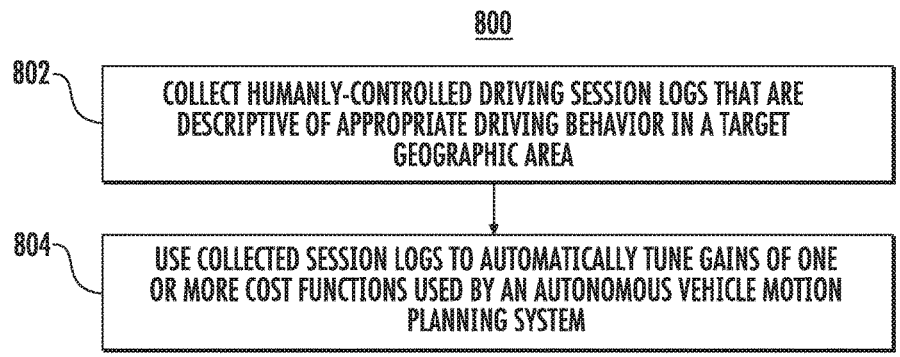
FIG. 8 depicts a flowchart diagram of an example method to train an autonomous vehicle motion planning system to approximate human driving behavior associated with a target geographic area according to example embodiments of the present disclosure.

FIG. 8 depicts a flowchart diagram of an example method 800 to train an autonomous vehicle motion planning system to approximate human driving behavior associated with a target geographic area according to example embodiments of the present disclosure.

At 802, a computing system collects humanly-controlled driving session logs that are descriptive of appropriate driving behavior in a target geographic area. At 804, the computing system uses the collected session logs to automatically tune gains of one or more cost functions used by an autonomous vehicle motion planning system.

More particularly, as an example, an existing autonomous vehicle motion planning system may have been tuned (e.g., automatically and/or manually) based on driving data or other testing data associated with a first geographic area. Thus, based on such tuning, the autonomous vehicle may be capable of approximating good human driving performance in such first geographic area.

However, the residents of different geographic areas have different driving styles. In addition, different geographic areas present different driving scenarios and challenges. Thus, an autonomous vehicle specifically tuned for performance in a first geographic area may exhibit decreased performance quality when autonomously driving in a second geographic area that is different than the first geographic area.

Thus, through performance of method 800, the gains of the autonomous vehicle motion planning system can be automatically tuned based on humanly-controlled driving session logs (and corresponding humanly-executed motion plans) that were collected during humanly-controlled driving sessions that were performed in a target geographic area (e.g., the second geographic area).

To provide an example for the purpose of illustration, an autonomous vehicle motion planning system tuned based on data and testing in Pittsburgh, Pa., USA may approximate human driving behavior that is appropriate in Pittsburgh. However, in some instances, such vehicle may not approximate the human driving behavior that is commonplace and appropriate in Manila, Philippines. For example, human drivers in Manila may be less averse to changing lanes, drive closer together, accelerate/decelerate faster, etc. Thus, to automatically tune the autonomous vehicle for autonomous driving in Manila, a human driver can operate a vehicle in Manila to generate a humanly-controlled session log that is indicative of appropriate human driving behavior in Manila (that is, driving behavior that is "good" driving from the perspective of a Manila resident or driver). The cost function gains of the autonomous vehicle can be automatically tuned based on such Manila session logs. After tuning, the autonomous vehicle motion planning system can generate autonomous motion paths that approximate appropriate human driving behavior in Manila. In other implementations, it is not required that the human driver actually be physically located in Manila, but instead that the driver simply operate the vehicle in the style of the residents Manila to generate the Manila session logs.

According to another aspect, a plurality of sets of tuned gains that respectively correspond to a plurality of different locations can be stored in memory. A particular set of gains can be selected based on the location of the autonomous vehicle and the selected set of gains can be loaded into the autonomous vehicle motion planning system for use, thereby enabling an autonomous vehicle to change driving behavior based on its current location.

Figure 9:
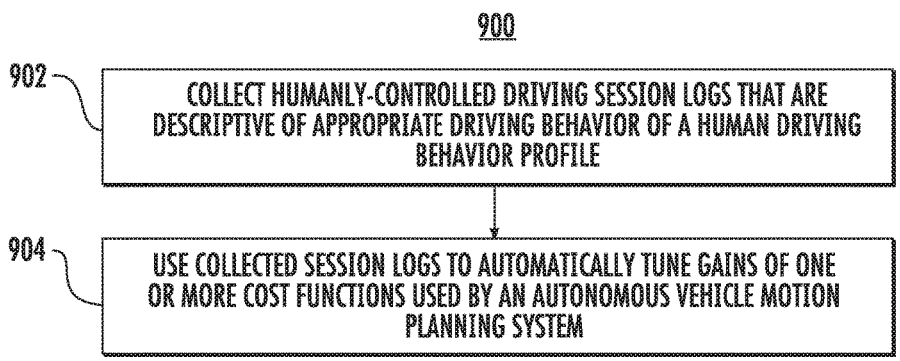
FIG. 9 depicts a flowchart diagram of an example method to train an autonomous vehicle motion planning system to approximate human driving behavior associated with a target driving style profile according to example embodiments of the present disclosure.

FIG. 9 depicts a flowchart diagram of an example method 900 to train an autonomous vehicle motion planning system to approximate human driving behavior associated with a target driving style profile according to example embodiments of the present disclosure.

At 902, a computing system collects humanly-controlled driving session logs that are descriptive of appropriate driving behavior of a human driving behavior profile. At 904, the computing system uses the collected session logs to automatically tune gains of one or more cost functions used by an autonomous vehicle motion planning system.

More particularly, as an example, human drivers can be requested to operate vehicles according to different human driving behavior profiles (e.g., sporty versus cautious). A corpus of humanly-controlled session logs can be collected for each driving behavior profile. Thereafter, the cost function gains of an autonomous vehicle motion planning system can be automatically tuned to approximate one of the driving behavior profiles. For example, the cost function gains of an autonomous vehicle motion planning system can be automatically tuned based on session logs that correspond to sporting human driving behavior. Thereafter, the tuned autonomous vehicle motion planning system can generate autonomous motion plans that fit the sporty driving behavior profile.

In one example implementation of the above, a plurality of different sets of gains that respectively correspond to the different human driving behavior profiles can be respectively automatically tuned and then stored in memory. A passenger of the autonomous vehicle can select (e.g., through an interface of the autonomous vehicle) which of the human driving behavior profiles they would like to autonomous vehicle to approximate. In response, the autonomous vehicle can load the particular gains associated with the selected behavior profile and can generate autonomous motion plans using such gains. Therefore, a human passenger can be given the ability to select the style of driving that she prefers.

Figure 10:
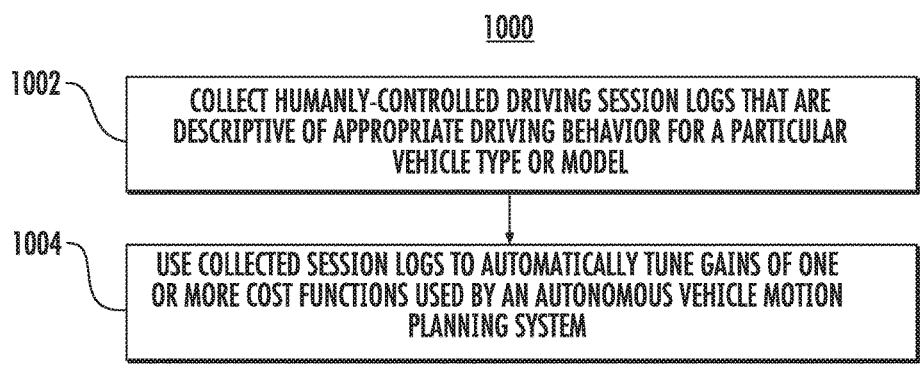
FIG. 10 depicts a flowchart diagram of an example method to train an autonomous vehicle motion planning system to approximate human driving behavior associated with a target vehicle type according to example embodiments of the present disclosure.

FIG. 10 depicts a flowchart diagram of an example method 1000 to train an autonomous vehicle motion planning system to approximate human driving behavior associated with a target vehicle type according to example embodiments of the present disclosure.

At 1002, a computing system collects humanly-controlled driving session logs that are descriptive of appropriate driving behavior for a particular vehicle type or model. At 1004, the computing system uses the collected session logs to automatically tune gains of one or more cost functions used by an autonomous vehicle motion planning system.

More particularly, as an example, human drivers can be requested to operate different vehicle types or models. A corpus of humanly-controlled session logs can be collected for each vehicle type or model. Thereafter, the cost function gains of an autonomous vehicle motion planning system can be automatically tuned to approximate human driving of one of the vehicle types or model. For example, the cost function gains of an autonomous vehicle motion planning system can be automatically tuned based on session logs that correspond to human operation of a delivery truck.

To provide an example for the purpose of illustration, an autonomous vehicle motion planning system tuned based on data and testing performed by a sedan may approximate human driving behavior that is appropriate for driving a sedan. However, in some instances, such motion planning system may not provide autonomous motion plans that are appropriate for a large truck. For example, human drivers of large trucks might take wider turns, leave more space between the nearest vehicle, apply braking earlier, etc. Thus, to automatically tune the autonomous vehicle motion planning system for use in a large truck, a human driver can operate a large truck to generate a humanly-controlled session log that is indicative of appropriate human driving behavior in a large truck. The cost function gains of the autonomous vehicle can be automatically tuned based on such large truck human driving session logs. After tuning, the autonomous vehicle motion planning system can generate autonomous motion paths that approximate appropriate human driving behavior for large trucks, rather than sedans.

Figure 15:
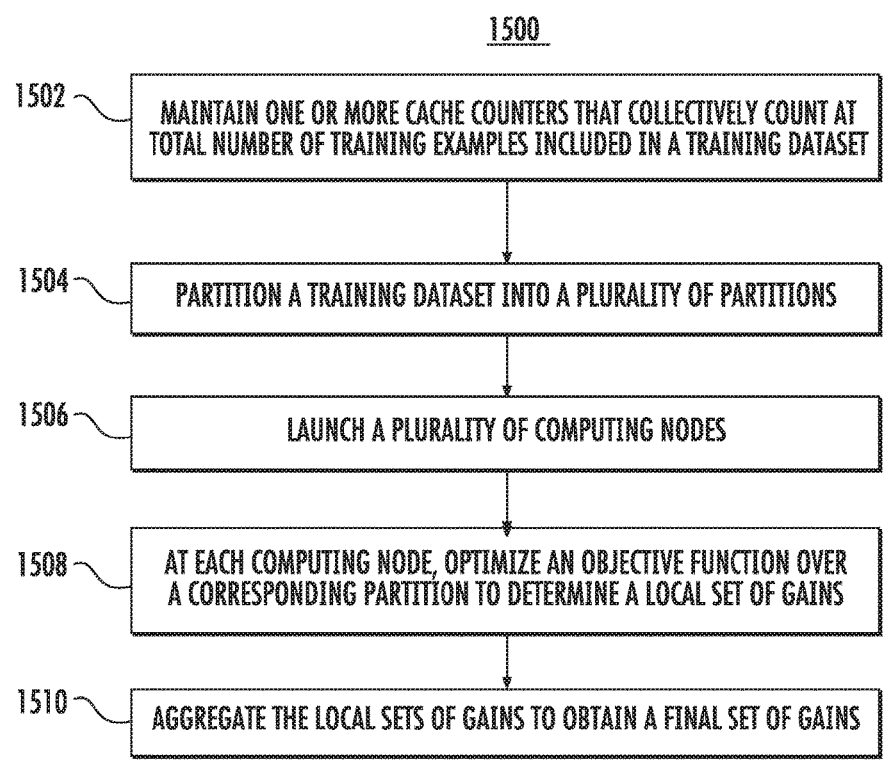
FIG. 15 depicts a flowchart diagram of an example method to perform distributed automatic tuning of cost function gains according to example embodiments of the present disclosure.

FIG. 15 depicts a flowchart diagram of an example method 1500 to perform distributed automatic tuning of cost function gains according to example embodiments of the present disclosure. Method 1500 can be performed by a distributed computing system.

At 1502, one or more cache counters that collectively count a total number of training examples included in a training dataset can be maintained. For example, maintaining the cache counter(s) at 1502 can include generating a new training example from a new data log and, in response to generating the new training example from the new data log, increasing one of the one or more cache counters. By maintaining the cache counter(s), the central computing device can easily track a total number of training examples included in the training dataset, preventing the need to perform a counting operation at partitioning time.

In some implementations, maintaining the cache counter(s) can include maintaining a single cache counter. In other implementations, maintaining the cache counter(s) can include maintaining a plurality of cache counters in parallel. For example, in some implementations, there is not one central cache counter; rather, every dataset shard has its own cache counter. Since these shards are created in parallel, the per-shard cache counters can also be created and/or maintained/increased in parallel. In some implementations, step 1502 can be performed concurrently with step 1504.

At 1504, the central computing device can partition a training dataset into a plurality of partitions. In some implementations, to partition the training dataset at 1504, the central computing device can define a quantity of the partitions and a number of examples to be included in each partition. The central computing device can generate an integer array that has a same length as the total number of training examples included in the training dataset such that each training example corresponds to one of the elements in the integer array. Further, for each of the plurality of partitions, an index of such partition can be repeated within the integer array as many times as the number of training examples that are to be included in such partition. The central computing device can randomly shuffle the integer array and, after randomly shuffling the integer array, assign each training example to the partition indicated by the index included in the element of the integer array that corresponds to such training example.

In some implementations, to partition the training dataset at 1504, the central computing device can separate training examples included in the training dataset into a plurality of chunks. For example, this can be performed after assignment of the training examples to particular partitions. The central computing device can create one or more jobs per chunk, where each job includes writing each training example in such chunk to a sub-folder associated with the partition to which such training example is assigned. In some implementations, worker computing devices can be called or otherwise used to respectively perform the jobs (e.g., to write the examples to the appropriate sub-folders in a parallel manner).

In addition, in some implementations, at 1504, the central computing device can create an additional job for each sub-folder, where the job includes aggregating all training examples included in such sub-folder into a single dataset object. Worker computing devices can again be called or used to perform the jobs (e.g., to aggregate training examples included in sub-folders in a parallel manner).

In some implementations, partitioning the training dataset at 1504 can include extracting, by a sharded dataset abstraction, training examples from multiple different logs in response to requests for such training examples. For example, extracting the training examples can include maintaining, by the sharded dataset abstraction, an index of filenames respective associated with training examples and deserializing, by the sharded dataset abstraction, a particular file to extract a particular training example when the particular training example is requested.

At 1506, the distributed computing system can launch a plurality of computing nodes. Each computing node can be provided with or access one of the plurality of partitions.

At 1508, each computing nodes optimizes an objective function over its corresponding partition to determine a local set of gains. As an example, at 1508, each computing node can individually perform some or all of method 700 to optimize an objective function over a corresponding partition of training examples (e.g., perform method 700 iteratively over a number of training examples). The objective function can have many forms including the examples described above which include constraints, margin(s), etc. In some implementations, the set of local gains can take the form of a local gain vector.

In some implementations, to optimize the objective function over its corresponding partition, each computing node can load all training examples included in its respective partition into a local memory of the computing node.

Each computing node can transmit its local set of gains to the central computing device. At 1510, the central computing device aggregates the local sets of gains to obtain a final set of gains. For example, at 1510, the central computing device can average the local sets of gains to obtain a final set of gains.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 7-10 and 15 respectively depict steps performed in a particular order for purposes of illustration and discussion, the methods of the present disclosure are not limited to the particularly illustrated order or arrangement. The various steps of the method 700, 800, 900, 1000, and/or 1500 can be omitted, rearranged, combined, and/or adapted in various ways without deviating from the scope of the present disclosure.

What is claimed is:

1. A computer-implemented method to automatically tune cost function gains of an autonomous vehicle motion planning system, the method comprising:
    partitioning, by a central computing device, a training dataset into a plurality of partitions, wherein each of the plurality of partitions comprises data descriptive of one or more humanly-executed motion plans that were executed by one or more human drivers during one or more previous humanly-controlled vehicle driving sessions, wherein the partitioning, by the central computing device, the training dataset into the plurality of partitions comprises:
    defining, by the central computing device, a quantity of the partitions and a number of examples to be included in each partition;
    generating, by the central computing device, an integer array that has a same length as a total number of training examples included in the training dataset so that each training example corresponds to a respective element in the integer array, and wherein, for each of the plurality of partitions, an index of the partition is repeated within the integer array as many times as the number of training examples that are to be included in the partition;
    randomly shuffling, by the central computing device, the integer array; and after the randomly shuffling the integer array, assigning, by the central computing device, each training example to the partition indicated by the index included in the element of the integer array that corresponds to the training example;
    launching, by the central computing device, a plurality of computing nodes;
    performing, by each of the plurality of computing nodes, the following operations on the respective data descriptive of the one or more humanly-executed motion plans included in a respective one of the plurality of partitions to generate a respective local set of gains;
    obtaining data descriptive of one of the humanly-executed motion plans that was executed by one of the one or more human drivers during one of the one or more previous humanly-controlled vehicle driving session;
    generating an autonomous motion plan based at least in part on a data log that includes data collected during the previous humanly-controlled vehicle driving session, wherein generating the autonomous motion plan comprises evaluating one or more cost functions, the one or more cost functions including a plurality of gain values;
    evaluating an objective function that provides an objective value based at least in part on a difference between a first total cost associated with the humanly-executed motion plan and a second total cost associated with the autonomous motion plan, wherein evaluating the objective function comprises:
    inputting the humanly-executed motion plan into the one or more cost functions of the autonomous vehicle motion planning system to determine the first total cost associated with the humanly-executed motion plan;
    inputting the autonomous motion plan into the one or more cost functions of the autonomous vehicle motion planning system to determine the second total cost associated with the autonomous motion plan;
    determining at least one adjustment to at least one of the plurality of gain values of the one or more cost functions that reduces the objective value provided by the objective function;
    aggregating, by the central computing device, local sets of gains generated by the plurality of computing nodes to generate a final set of gains;
    using, by a vehicle computing system, the final set of gains to generate an additional autonomous motion plan for an autonomous vehicle; and
    controlling, by the vehicle computing system, the autonomous vehicle to execute the additional autonomous motion plan.

2. The computer-implemented method of claim 1, wherein the partitioning, by the central computing device, the training dataset into the plurality of partitions further comprises:
    separating, by the central computing device, training examples included in the training dataset into a plurality of chunks;
    writing, by a respective worker computing device for each of the plurality of chunks, each training example in each chunk of the plurality of chunks to a sub-folder associated with the partition to which the training example is assigned.

3. The computer-implemented method of claim 2, wherein the partitioning, by the central computing device, the training dataset into the plurality of partitions further comprises:
 aggregating, by the respective worker computing device for each sub-folder, all the training examples included in the sub-folder into a single dataset object.

4. The computer-implemented method of claim 1, wherein the partitioning, by the central computing device, the training dataset into the plurality of partitions further comprises:
 extracting, by a sharded dataset abstraction, the training examples from multiple different logs in response to requests for the training examples.

5. The computer-implemented method of claim 4, wherein the extracting, by the sharded dataset abstraction, the training examples further comprises:
 maintaining, by the sharded dataset abstraction, an index of filenames respective associated with the training examples; and
 deserializing, by the sharded dataset abstraction, a particular file to extract a particular training example when the particular training example is requested.

6. The computer-implemented method of claim 1, wherein the method further comprises:
 maintaining one or more cache counters that collectively count the total number of training examples included in the training dataset.

7. The computer-implemented method of claim 6, wherein the maintaining the one or more cache counters comprises:
 generating a new training example from a new data log; and
 in response to generating the new training example from the new data log, increasing one of the one or more cache counters.

8. The computer-implemented method of claim 1, wherein the method further comprises:
 loading, by each of the plurality of computing nodes, all the training examples included in the respective one of the plurality of partitions into a local memory of the computing node.

9. The computer-implemented method of claim 1, wherein the aggregating, by the central computing device, the local sets of gains to generate the final set of gains comprises averaging, by the central computing device, the local sets of gains to generate the final set of gains.

10. A computer-implemented method to automatically tune cost function gains of an autonomous vehicle motion planning system, the method comprising:
 partitioning, by a central computing device, a training dataset into a plurality of partitions, wherein each of the plurality of partitions comprises data descriptive of one or more humanly-executed motion plans that were executed by one or more human drivers during one or more previous humanly-controlled vehicle driving sessions, wherein the partitioning, by the central computing device, the training dataset into the plurality of partitions comprises:
 separating, by the central computing device, training examples included in the training dataset into a plurality of chunks;
 writing, by a respective worker computing device for each of the plurality of chunks, each training example in the chunk to a sub-folder associated with the partition to which the training example is assigned;
 launching, by the central computing device, a plurality of computing nodes;
 performing, by each of the plurality of computing nodes, the following operations on the respective data descriptive of the one or more humanly-executed motion plans included in a respective one of the plurality of partitions to generate a respective local set of gains;
 obtaining data descriptive of one of the humanly-executed motion plans that was executed by one of the one or more human drivers during one of the one or more previous humanly-controlled vehicle driving session;
 generating an autonomous motion plan based at least in part on a data log that includes data collected during the previous humanly-controlled vehicle driving session, wherein generating the autonomous motion plan comprises evaluating one or more cost functions, the one or more cost functions including a plurality of gain values;
 evaluating an objective function that provides an objective value based at least in part on a difference between a first total cost associated with the humanly-executed motion plan and a second total cost associated with the autonomous motion plan, wherein evaluating the objective function comprises:
 inputting the humanly-executed motion plan into the one or more cost functions of the autonomous vehicle motion planning system to determine the first total cost associated with the humanly-executed motion plan;
 inputting the autonomous motion plan into the one or more cost functions of the autonomous vehicle motion planning system to determine the second total cost associated with the autonomous motion plan;
 determining at least one adjustment to at least one of the plurality of gain values of the one or more cost functions that reduces the objective value provided by the objective function;
 aggregating, by the central computing device, the local sets of gains generated by the plurality of computing nodes to generate a final set of gains;
 using, by a vehicle computing system, the final set of gains to generate an additional autonomous motion plan for an autonomous vehicle; and
 controlling, by the vehicle computing system, the autonomous vehicle to execute the additional autonomous motion plan.

11. The computer-implemented method of claim 10, wherein the partitioning, by the central computing device, the training dataset into the plurality of partitions further comprises:
 aggregating, by the respective worker computing device for each sub-folder, all the training examples included in the sub-folder into a single dataset object.

12. A computer-implemented method to automatically tune cost function gains of an autonomous vehicle motion planning system, the method comprising:
 partitioning, by a central computing device, a training dataset into a plurality of partitions, wherein each of the plurality of partitions comprises data descriptive of one or more humanly-executed motion plans that were executed by one or more human drivers during one or more previous humanly-controlled vehicle driving sessions, wherein the partitioning, by the central computing device, the training dataset into the plurality of partitions comprises extracting, by a sharded dataset abstraction, training examples from multiple different logs in response to requests for the training examples;
 launching, by the central computing device, a plurality of computing nodes;

performing, by each of the plurality of computing nodes, the following operations on the respective data descriptive of the one or more humanly-executed motion plans included in a respective one of the plurality of partitions to generate a respective local set of gains;

obtaining data descriptive of one of the humanly-executed motion plans that was executed by one of the one or more human drivers during one of the one or more previous humanly-controlled vehicle driving session;

generating an autonomous motion plan based at least in part on a data log that includes data collected during the previous humanly-controlled vehicle driving session, wherein generating the autonomous motion plan comprises evaluating one or more cost functions, the one or more cost functions including a plurality of gain values;

evaluating an objective function that provides an objective value based at least in part on a difference between a first total cost associated with the humanly-executed motion plan and a second total cost associated with the autonomous motion plan, wherein evaluating the objective function comprises:

inputting the humanly-executed motion plan into the one or more cost functions of the autonomous vehicle motion planning system to determine the first total cost associated with the humanly-executed motion plan;

inputting the autonomous motion plan into the one or more cost functions of the autonomous vehicle motion planning system to determine the second total cost associated with the autonomous motion plan;

determining at least one adjustment to at least one of the plurality of gain values of the one or more cost functions that reduces the objective value provided by the objective function;

aggregating, by the central computing device, the local sets of gains generated by the plurality of computing nodes to generate a final set of gains;

using, by a vehicle computing system, the final set of gains to generate an additional autonomous motion plan for an autonomous vehicle; and controlling, by the vehicle computing system, the autonomous vehicle to execute the additional autonomous motion plan.

13. The computer-implemented method of claim 12, wherein the extracting, by the sharded dataset abstraction, the training examples further comprises:

maintaining, by the sharded dataset abstraction, an index of filenames respective associated with the training examples; and deserializing, by the sharded dataset abstraction, a particular file to extract a particular training example when the particular training example is requested.

14. A computer-implemented method to automatically tune cost function gains of an autonomous vehicle motion planning system, the method comprising:

maintaining one or more cache counters that collectively count a total number of training examples included in a training dataset;

partitioning, by a central computing device, the training dataset into a plurality of partitions, wherein each of the plurality of partitions comprises data descriptive of one or more humanly-executed motion plans that were executed by one or more human drivers during one or more previous humanly-controlled vehicle driving sessions;

launching, by the central computing device, a plurality of computing nodes;

performing, by each of the plurality of computing nodes, the following operations on the respective data descriptive of the one or more humanly-executed motion plans included in a respective one of the plurality of partitions to generate a respective local set of gains;

obtaining data descriptive of one of the humanly-executed motion plans that was executed by one of the one or more human drivers during one of the one or more previous humanly-controlled vehicle driving session;

generating an autonomous motion plan based at least in part on a data log that includes data collected during the previous humanly-controlled vehicle driving session, wherein generating the autonomous motion plan comprises evaluating one or more cost functions, the one or more cost functions including a plurality of gain values;

evaluating an objective function that provides an objective value based at least in part on a difference between a first total cost associated with the humanly-executed motion plan and a second total cost associated with the autonomous motion plan, wherein evaluating the objective function comprises:

inputting the humanly-executed motion plan into the one or more cost functions of the autonomous vehicle motion planning system to determine the first total cost associated with the humanly-executed motion plan;

inputting the autonomous motion plan into the one or more cost functions of the autonomous vehicle motion planning system to determine the second total cost associated with the autonomous motion plan;

determining at least one adjustment to at least one of the plurality of gain values of the one or more cost functions that reduces the objective value provided by the objective function;

aggregating, by the central computing device, the local sets of gains generated by the plurality of computing nodes to generate a final set of gains;

using, by a vehicle computing system, the final set of gains to generate an additional autonomous motion plan for an autonomous vehicle; and controlling, by the vehicle computing system, the autonomous vehicle to execute the additional autonomous motion plan.

15. The computer-implemented method of claim 14, wherein the maintaining the one or more cache counters comprises:

generating a new training example from a new data log; and in response to generating the new training example from the new data log, increasing one of the one or more cache counters.

16. A computer-implemented method to automatically tune cost function gains of an autonomous vehicle motion planning system, the method comprising:

partitioning, by a central computing device, a training dataset into a plurality of partitions, wherein each of the plurality of partitions comprises data descriptive of one or more humanly-executed motion plans that were executed by one or more human drivers during one or more previous humanly-controlled vehicle driving sessions;

launching, by the central computing device, a plurality of computing nodes;

performing, by each of the plurality of computing nodes, the following operations on the respective data descriptive of the one or more humanly-executed motion plans included in a respective one of the plurality of partitions to generate a respective local set of gains;

loading, by each of the plurality of computing nodes, all training examples included in the respective one of the plurality of partitions into a local memory of the computing node;

obtaining data descriptive of one of the humanly-executed motion plans that was executed by one of the one or more human drivers during one of the one or more previous humanly-controlled vehicle driving session;

generating an autonomous motion plan based at least in part on a data log that includes data collected during the previous humanly-controlled vehicle driving session, wherein generating the autonomous motion plan comprises evaluating one or more cost functions, the one or more cost functions including a plurality of gain values;

evaluating an objective function that provides an objective value based at least in part on a difference between a first total cost associated with the humanly-executed motion plan and a second total cost associated with the autonomous motion plan, wherein evaluating the objective function comprises:

inputting the humanly-executed motion plan into the one or more cost functions of the autonomous vehicle motion planning system to determine the first total cost associated with the humanly-executed motion plan;

inputting the autonomous motion plan into the one or more cost functions of the autonomous vehicle motion planning system to determine the second total cost associated with the autonomous motion plan;

determining at least one adjustment to at least one of the plurality of gain values of the one or more cost functions that reduces the objective value provided by the objective function;

aggregating, by the central computing device, the local sets of gains generated by the plurality of computing nodes to generate a final set of gains;

using, by a vehicle computing system, the final set of gains to generate an additional autonomous motion plan for an autonomous vehicle; and controlling, by the vehicle computing system, the autonomous vehicle to execute the additional autonomous motion plan.

* * * * *